(12) United States Patent
Capela et al.

(10) Patent No.: US 8,619,100 B2
(45) Date of Patent: Dec. 31, 2013

(54) DEVICE, METHOD, AND GRAPHICAL USER INTERFACE FOR TOUCH-BASED GESTURAL INPUT ON AN ELECTRONIC CANVAS

(75) Inventors: Jay Christopher Capela, Santa Cruz, CA (US); Akiva Dov Leffert, San Francisco, CA (US); Jason Robert Marr, Cupertino, CA (US); Christopher Douglas Weeldreyer, San Carlos, CA (US); Peter William Rapp, Pittsburgh, OK (US)

(73) Assignee: Apple Inc., Cupertino, CA (US)

( * ) Notice: Subject to any disclaimer, the term of this patent is extended or adjusted under 35 U.S.C. 154(b) by 1132 days.

(21) Appl. No.: 12/567,703

(22) Filed: Sep. 25, 2009

(65) Prior Publication Data

US 2011/0074828 A1     Mar. 31, 2011

(51) Int. Cl.
*G09G 5/00*     (2006.01)

(52) U.S. Cl.
USPC ........................ 345/660; 345/173; 715/865

(58) Field of Classification Search
USPC ......... 345/649, 651, 660, 662, 672, 684, 173; 715/863
See application file for complete search history.

(56) References Cited

U.S. PATENT DOCUMENTS

| | | | |
|---|---|---|---|
| 5,424,756 A * | 6/1995 | Ho et al. | 345/158 |
| 7,614,008 B2 | 11/2009 | Ording | 715/773 |
| 2005/0270311 A1* | 12/2005 | Rasmussen et al. | 345/677 |
| 2006/0026536 A1* | 2/2006 | Hotelling et al. | 715/863 |
| 2006/0031786 A1* | 2/2006 | Hillis et al. | 715/863 |
| 2007/0226646 A1* | 9/2007 | Nagiyama et al. | 715/784 |
| 2008/0120576 A1* | 5/2008 | Kariathungal et al. | 715/863 |
| 2008/0168404 A1* | 7/2008 | Ording | 715/863 |
| 2008/0309632 A1* | 12/2008 | Westerman et al. | 345/173 |
| 2010/0241999 A1* | 9/2010 | Russ et al. | 715/863 |
| 2011/0029917 A1* | 2/2011 | Um | 715/800 |

FOREIGN PATENT DOCUMENTS

| | | | | |
|---|---|---|---|---|
| EP | 1 517 228 A2 | 3/2005 | | G06F 3/033 |
| WO | WO 2009/084809 A1 | 7/2009 | | G06F 3/041 |

OTHER PUBLICATIONS

Android-Creating Menus ("http://www.linuxtopia.org/online_books/android/devguide/guide/topics/ui/menus.html"), Feb. 13, 2009.*
Matt Hayward ("matthayward.com/2008/12/13/how-to-move-icons-on-your-iphone.htm"), Dec. 13, 2008.*
International Search Report and Written Opinion dated Nov. 29, 2010, received in International Application No. PCT/US2010/048889, which corresponds to U.S. Appl. No. 12/567,703.

* cited by examiner

*Primary Examiner* — Michelle L Sams
(74) *Attorney, Agent, or Firm* — Morgan, Lewis & Bockius LLP

(57) ABSTRACT

Methods for touch-based gestural command input on a device with a touch-sensitive surface and a display are disclosed. In one embodiment, a method includes displaying an electronic canvas including an object at a first magnification level; simultaneously detecting a first and a second contact on the touch-sensitive surface, wherein at least one of the first contact and the second contact on the touch-sensitive surface is at a location that corresponds to a location on the display that is away from the object; detecting a gesture made with the first and second contacts; when a velocity of the gesture is less than a predefined gesture velocity threshold, scaling the electronic canvas in accordance with the gesture; and, when the velocity of the gesture is greater than the predefined gesture velocity threshold transitioning the electronic canvas from the first magnification level to a second, predefined magnification level in response to the gesture.

25 Claims, 21 Drawing Sheets

When at least one of the first contact location and the second contact location on the touch-sensitive surface is at a location that corresponds to a location on the display that is on the at least one displayed object: in response to detecting the first contact and the second contact by the user on the touch-sensitive surface, calculate an initial angle between an axis between the first contact and the second contact and an axis corresponding to the touch-sensitive surface; while detecting the first gesture, calculate a rotation angle between the initial angle and a current angle formed between the axis between the first contact and the second contact and the axis corresponding to the touch-sensitive surface; when the rotation angle is less than a first predefined angular rotation value maintain the displayed object at an orientation corresponding to the initial angle; when the rotation angle is between the first predefined angular rotation value and a second predefined angular rotation value, rotate the displayed object by the calculated rotation angle on the electronic canvas; and, when the rotation angle is greater than the second predefined angular rotation value, rotate the displayed object in predefined rotational increments in accordance with the first gesture. —624

When the current angle exceeds the first predefined angular rotation value, returning the electronic canvas to the first magnification level. —626

Once the calculated rotation angle has exceeded the second predefined angular rotation value, the displayed object is rotated in predefined rotational increments in accordance with the first gesture even if the calculated rotation angle falls below the second predefined angular rotation value. —628

When the electronic canvas has been scaled in accordance with the first gesture to exceed a threshold scaling amount, maintaining the displayed object at an orientation corresponding to the initial angle independent of the calculated rotation angle. —630

Figure 6B

```
┌─────────────────────────────────────────────────────────────────────┐
│ Detect liftoff of the second contact from the touch-sensitive surface, and detect │
│   that the first contact touches a location on the touch-sensitive surface        │─632
│   corresponding to the at least one displayed object on the electronic canvas.    │
│  ┌───────────────────────────────────────────────────────────────┐                │
│  │ Select the at least one displayed object when the first contact continues to │─634
│  │ touch the at least one displayed object for at least a first predefined time │
│  │                              interval.                                       │
│  │ ┌─────────────────────────────────────────────────────────────┐              │
│  │ │ Display a context menu on the electronic canvas in response to detecting │─636
│  │ │ that the first contact touches a location on the touch-sensitive surface │
│  │ │ corresponding to the at least one displayed object for at least a second │
│  │ │ predefined time interval, wherein the second predefined time interval is │
│  │ │     greater than the first predefined time interval.                     │
│  │ │ ┌─────────────────────────────────────────────────────────┐              │
│  │ │ │    Detect a fourth gesture made with the first contact on the touch   │
│  │ │ │ sensitive surface that moves on the touch sensitive surface more than │─638
│  │ │ │ a predefined distance; in response to detecting that the fourth gesture: │
│  │ │ │     cease to display the context menu; and, move the at least one     │
│  │ │ │ displayed object on the electronic canvas in accordance with the fourth│
│  │ │ │                              gesture.                                  │
│  │ │ └─────────────────────────────────────────────────────────┘              │
│  │ ┌─────────────────────────────────────────────────────────────┐            │
│  │ │   Detect a third gesture made with the first contact on the touch sensitive │
│  │ │     surface; and move the at least one displayed object on the electronic  │─640
│  │ │  canvas in accordance with the third gesture when the third gesture moves │
│  │ │          on the touch sensitive surface more than a predefined distance.   │
│  │ └─────────────────────────────────────────────────────────────┘            │
│  ┌───────────────────────────────────────────────────────────────┐             │
│  │ After detecting liftoff of the second contact from the touch-sensitive surface, │
│  │   detect a second gesture made with the first contact on the touch sensitive  │
│  │   surface; and pan the electronic canvas on the display in accordance with    │─642
│  │   the second gesture when the first contact moves on the touch sensitive      │
│  │              surface more than a predefined distance.                         │
│  │ ┌─────────────────────────────────────────────────────────────┐              │
│  │ │ Scroll the electronic canvas on the display in accordance with the second │
│  │ │ gesture when a velocity of the second gesture is greater than a second    │
│  │ │                 predefined gesture velocity threshold.                    │─644
│  │ └─────────────────────────────────────────────────────────────┘              │
│  └───────────────────────────────────────────────────────────────┘             │
└─────────────────────────────────────────────────────────────────────┘
```

Figure 6C

DEVICE, METHOD, AND GRAPHICAL USER INTERFACE FOR TOUCH-BASED GESTURAL INPUT ON AN ELECTRONIC CANVAS

TECHNICAL FIELD

The disclosed embodiments relate generally to electronic devices with touch-sensitive surfaces, and more particularly, to electronic devices and methods for touch-based gestural input via touch-sensitive surfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects within an electronic canvas through touch-based gestural command inputs.

But existing methods for touch-based gestural command input within electronic canvases are cumbersome and inefficient, creating a significant cognitive burden on a user. For example, when a device supports a rich collection of input gestures for a touch-sensitive surface, it can be challenging for a user to distinguish between physically similar gestures, recall the different gestures that are available for particular operations, or transition between gestures. In addition, existing methods take longer than necessary, thereby wasting energy. This latter consideration is particularly important in battery-operated devices.

As a result, there is a need for improved gestures and gesture processing techniques that allow a user to employ a rich set of gestures for a touch-sensitive surface with increased efficiency and ease of recall. Such methods and interfaces reduce the cognitive burden on a user and produce a more efficient human-machine interface. For battery-operated computing devices, such methods and interfaces conserve power and increase the time between battery charges.

SUMMARY

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. The method includes: displaying an electronic canvas on the display at a first magnification level, wherein the displayed electronic canvas includes at least one displayed object; simultaneously detecting a first contact at a first location and a second contact at a second location on the touch-sensitive surface, wherein at least one of the first contact location and the second contact location on the touch-sensitive surface is at a location that corresponds to a location on the display that is away from the at least one displayed object; detecting a first gesture made with the first and second contacts on the touch-sensitive surface; when a velocity of the first gesture is less than a predefined gesture velocity threshold, scaling the displayed electronic canvas in accordance with the first gesture; and, when the velocity of the first gesture is greater than the predefined gesture velocity threshold transitioning the displayed electronic canvas from the first magnification level to a second, predefined magnification level in response to the first gesture.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: displaying an electronic canvas on the display at a first magnification level, wherein the displayed electronic canvas includes at least one displayed object; simultaneously detecting a first contact at a first location and a second contact at a second location on the touch-sensitive surface, wherein at least one of the first contact location and the second contact location on the touch-sensitive surface is at a location that corresponds to a location on the display that is away from the at least one displayed object; detecting a first gesture made with the first and second contacts on the touch-sensitive surface; when a velocity of the first gesture is less than a predefined gesture velocity threshold, scaling the displayed electronic canvas in accordance with the first gesture; and, when the velocity of the first gesture is greater than the predefined gesture velocity threshold, transitioning the displayed electronic canvas from the first magnification level to a second, predefined magnification level in response to the first gesture.

In accordance with some embodiments, a computer readable storage medium has stored therein instructions which when executed by a multifunction device with a display and a touch-sensitive surface, cause the device to: display an electronic canvas on the display at a first magnification level, wherein the displayed electronic canvas includes at least one displayed object; simultaneously detect a first contact at a first location and a second contact at a second location on the touch-sensitive surface, wherein at least one of the first contact location and the second contact location on the touch-sensitive surface is at a location that corresponds to a location on the display that is away from the at least one displayed object; detect a first gesture made with the first and second contacts on the touch-sensitive surface; when a velocity of the first gesture is less than a predefined gesture velocity threshold, scale the displayed electronic canvas in accordance with the first gesture; and, when the velocity of the first gesture is greater than the predefined gesture velocity threshold, transition the displayed electronic canvas from the first magnification level to a second, predefined magnification level in response to the first gesture.

In accordance with some embodiments, a graphical user interface on a multifunction device with a display, a touch-sensitive surface, a memory, and one or more processors to execute one or more programs stored in the memory includes an electronic canvas on the display at a first magnification level, wherein the displayed electronic canvas includes at least one displayed object, wherein: a first contact at a first location and a second contact at a second location is simultaneously detected on the touch-sensitive surface, wherein at least one of the first contact location and the second contact location on the touch-sensitive surface is at a location that corresponds to a location on the display that is away from the at least one displayed object; a first gesture made with the first and second contacts is detected on the touch-sensitive surface; when a velocity of the first gesture is less than a predefined gesture velocity threshold, the displayed electronic canvas is scaled in accordance with the first gesture; and, when the velocity of the first gesture is greater than the predefined gesture velocity threshold, the displayed electronic canvas is transitioned from the first magnification level to a second, predefined magnification level in response to the first gesture.

In accordance with some embodiments, a multifunction device includes: a display; a touch-sensitive surface; means for displaying an electronic canvas on the display at a first magnification level, wherein the displayed electronic canvas includes at least one displayed object; means for simultaneously detecting a first contact at a first location and a second contact at a second location on the touch-sensitive surface, wherein at least one of the first contact location and the second contact location on the touch-sensitive surface is at a location that corresponds to a location on the display that is away from the at least one displayed object; means for detecting a first gesture made with the first and second contacts on the touch-sensitive surface; when a velocity of the first gesture is less than a predefined gesture velocity threshold, means for scaling the displayed electronic canvas in accordance with the first gesture; and, when the velocity of the first gesture is greater than the predefined gesture velocity threshold, means for transitioning the displayed electronic canvas from the first magnification level to a second, predefined magnification level in response to the first gesture.

In accordance with some embodiments, an information processing apparatus for use in a multifunction device with a display and a touch-sensitive surface includes: means for displaying an electronic canvas on the display at a first magnification level, wherein the displayed electronic canvas includes at least one displayed object; means for simultaneously detecting a first contact at a first location and a second contact at a second location on the touch-sensitive surface, wherein at least one of the first contact location and the second contact location on the touch-sensitive surface is at a location that corresponds to a location on the display that is away from the at least one displayed object; means for detecting a first gesture made with the first and second contacts on the touch-sensitive surface; when a velocity of the first gesture is less than a predefined gesture velocity threshold, means for scaling the displayed electronic canvas in accordance with the first gesture; and, when the velocity of the first gesture is greater than the predefined gesture velocity threshold, means for transitioning the displayed electronic canvas from the first magnification level to a second, predefined magnification level in response to the first gesture.

Thus, multifunction devices with displays and touch-sensitive surfaces are provided with faster, more efficient methods and interfaces for touch-based gestural command input, thereby increasing the effectiveness, efficiency, and user satisfaction with such devices. Such methods and interfaces may complement or replace conventional methods for touch-based gestural command input.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6C are flow diagrams illustrating a method of touch-based gestural command input in accordance with some embodiments.

DESCRIPTION OF EMBODIMENTS

Figure 1A:
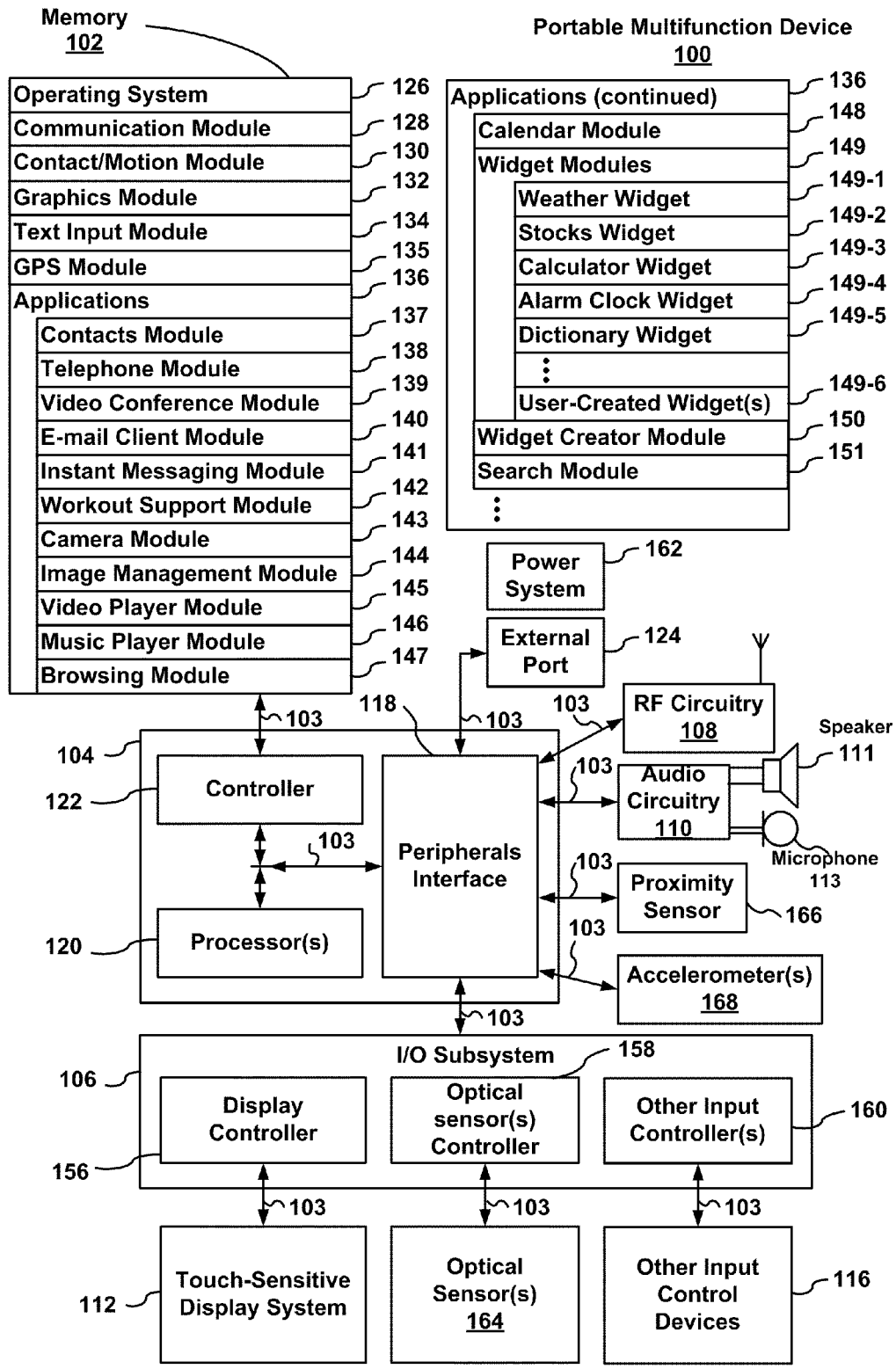
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
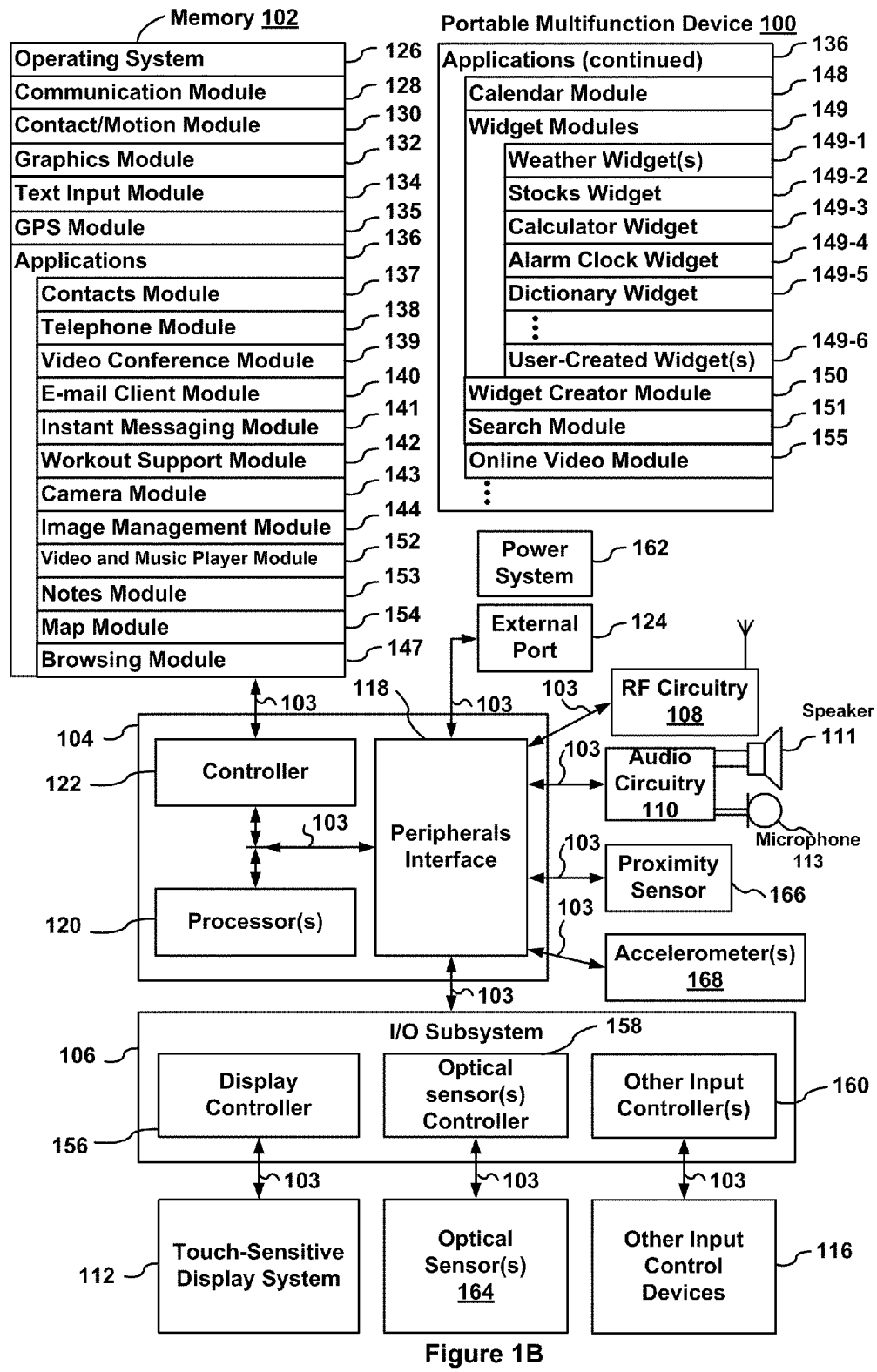

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of the touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive touchpads do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contacts list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
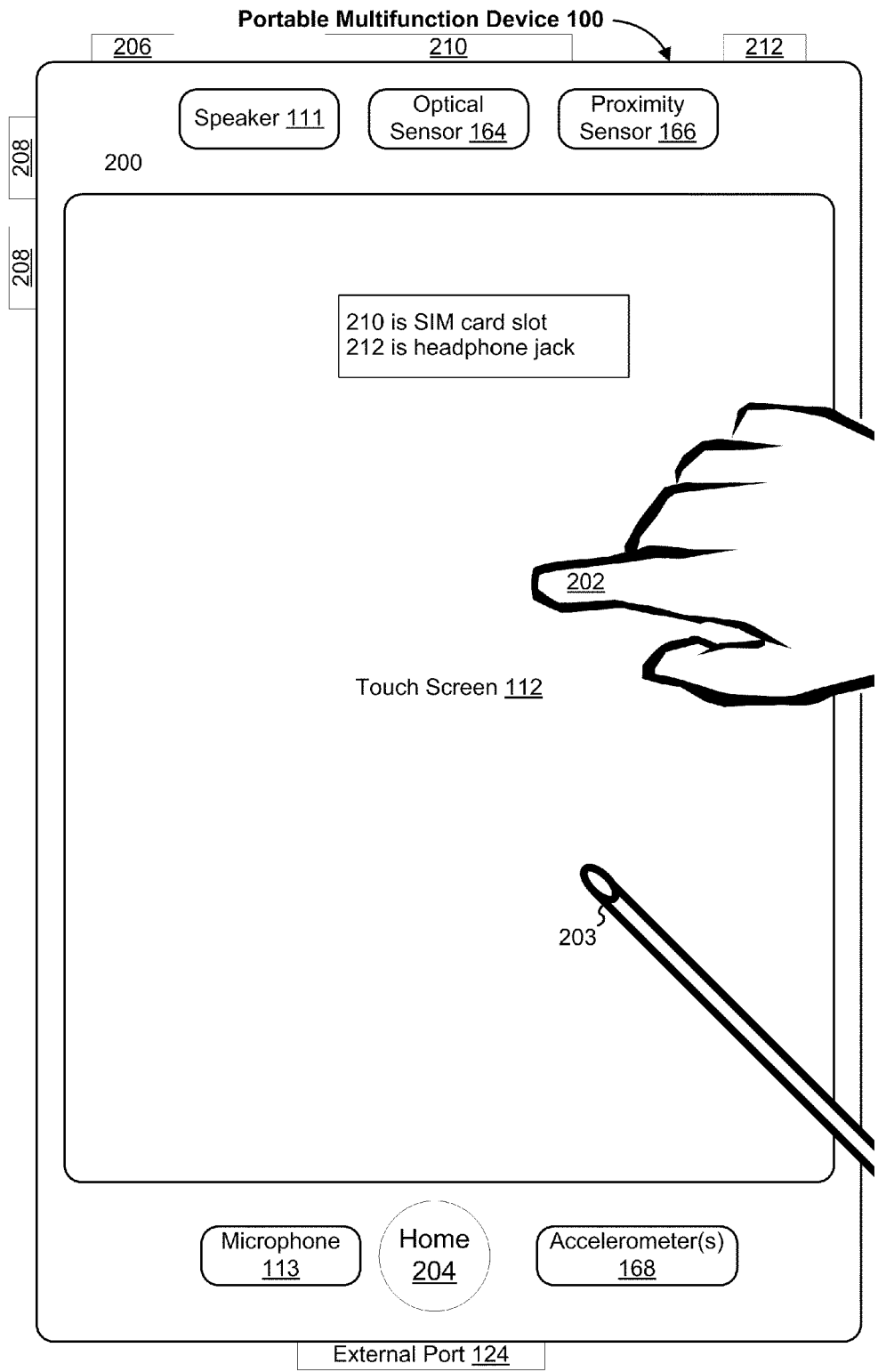
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
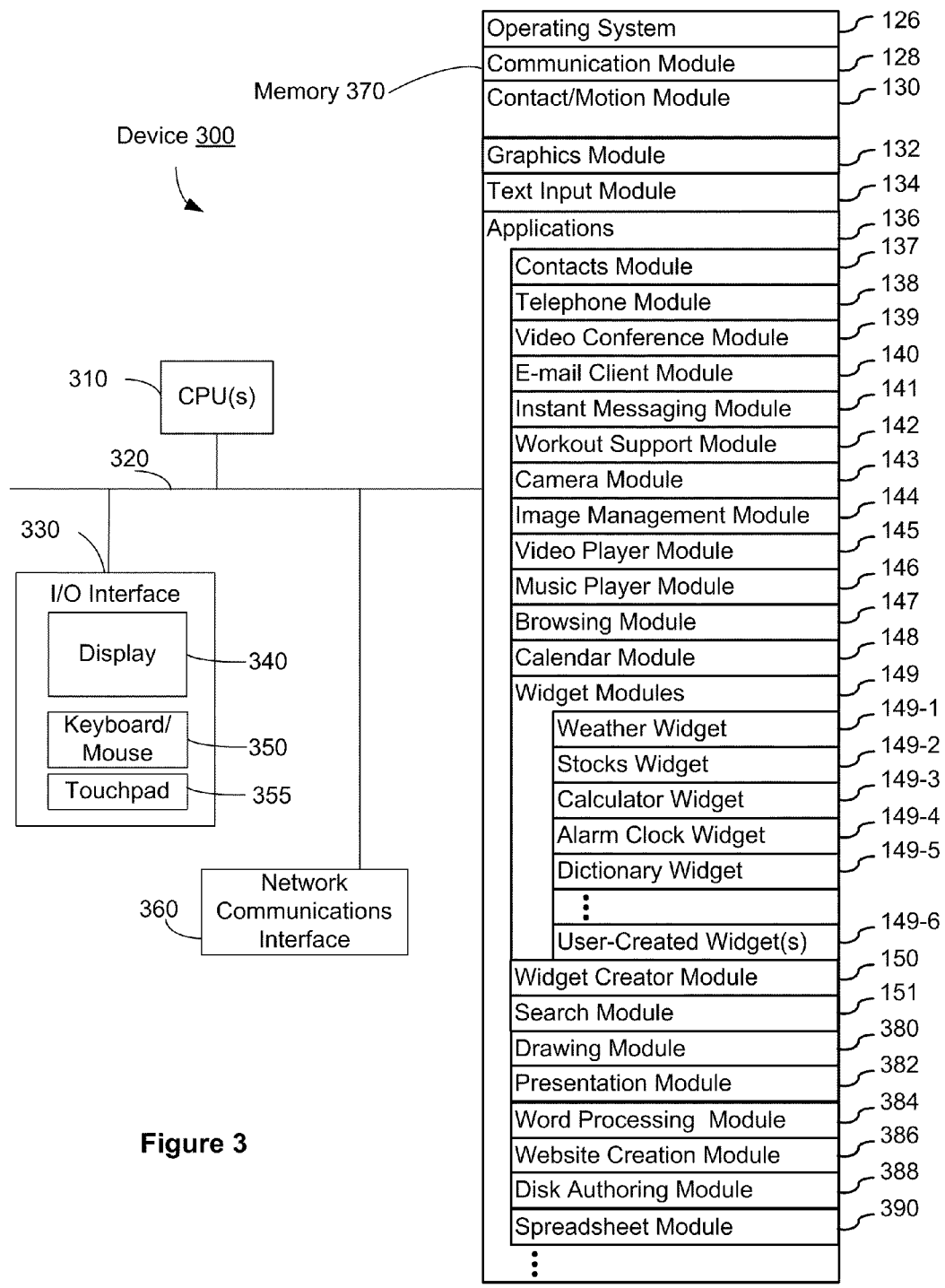
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which is typically a touch screen display. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
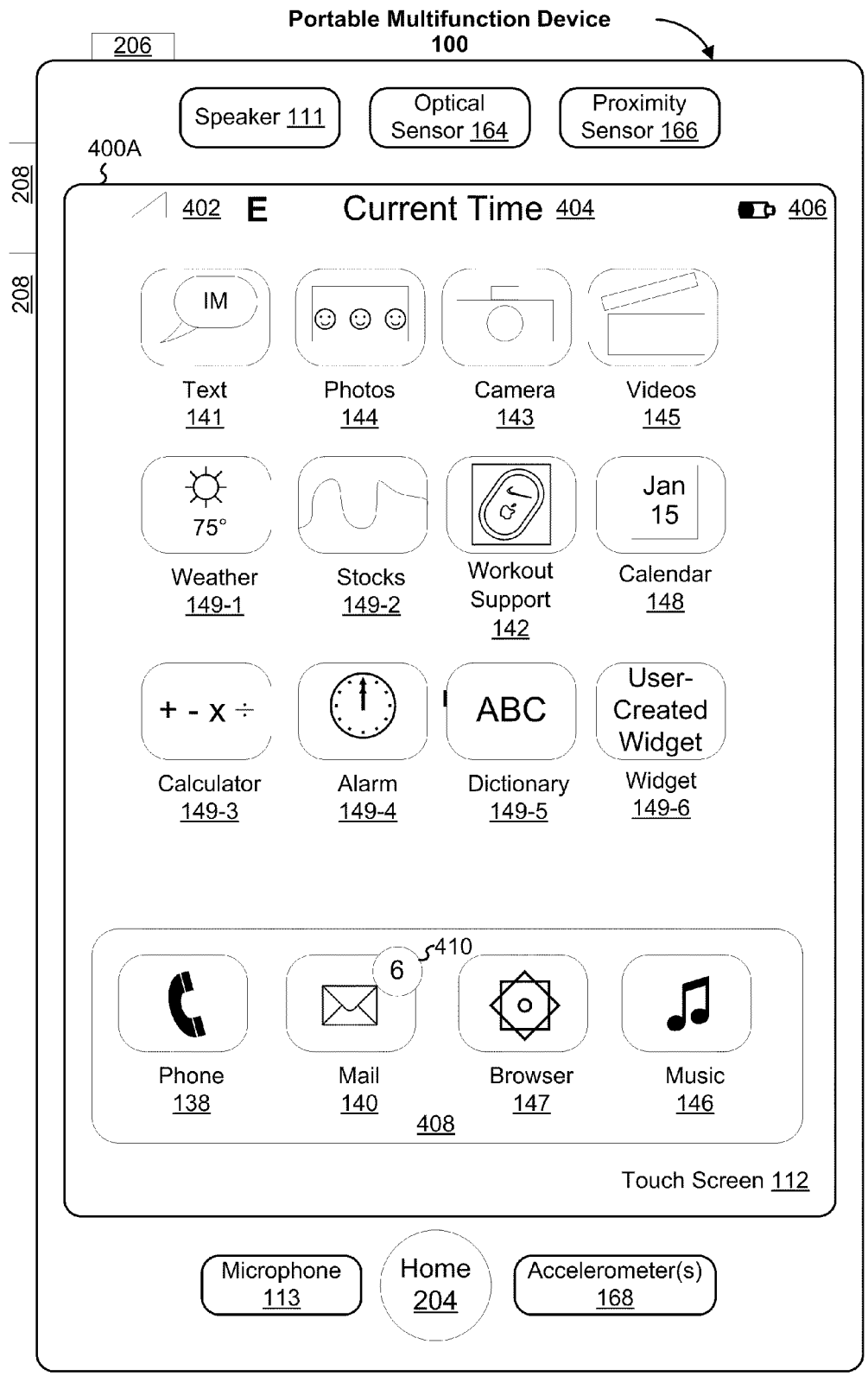
FIGS. 4A and 4B illustrate exemplary user interfaces for a menu of applications on a portable multifunction device in accordance with some embodiments.
Figure 4B:
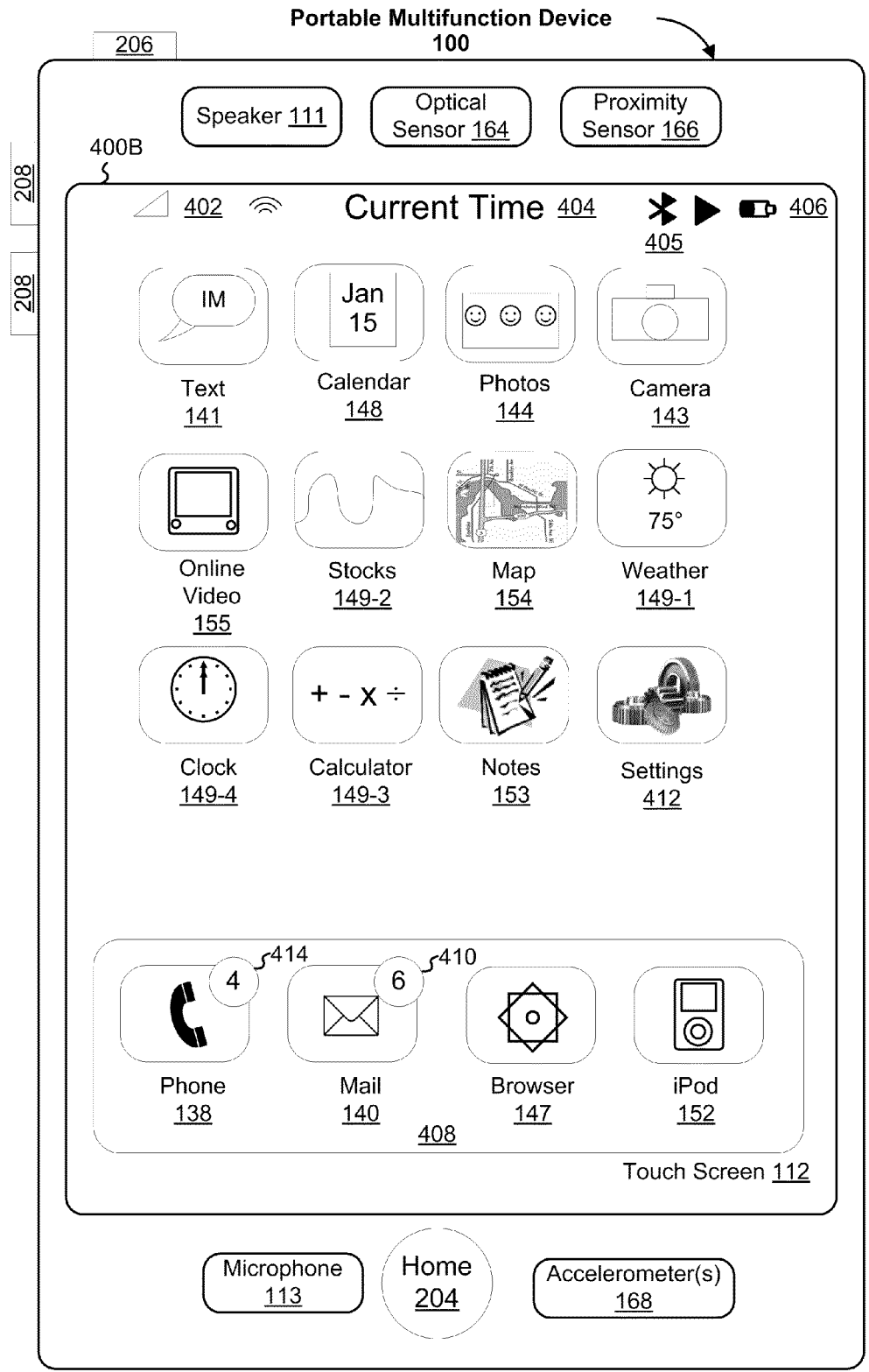

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Phone 138, which may include an indicator 414 of the number of missed calls or voicemail messages;

E-mail client 140, which may include an indicator 410 of the number of unread e-mails;

Browser 147; and

Music player 146; and

Icons for other applications, such as:

IM 141;

Image management 144;

Camera 143;

Video player 145;

Weather 149-1;

Stocks 149-2;

Workout support 142;

Calendar 148;

Calculator 149-3;

Alarm clock 149-4;

Dictionary 149-5; and

User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;

Map 154;

Notes 153;

Settings 412, which provides access to settings for the device 100 and its various applications 136, as described further below;

Video and music player module 152, also referred to as iPod (trademark of Apple Inc.) module 152; and Online video module 155, also referred to as YouTube (trademark of Google Inc.) module 155.

Figure 4C:
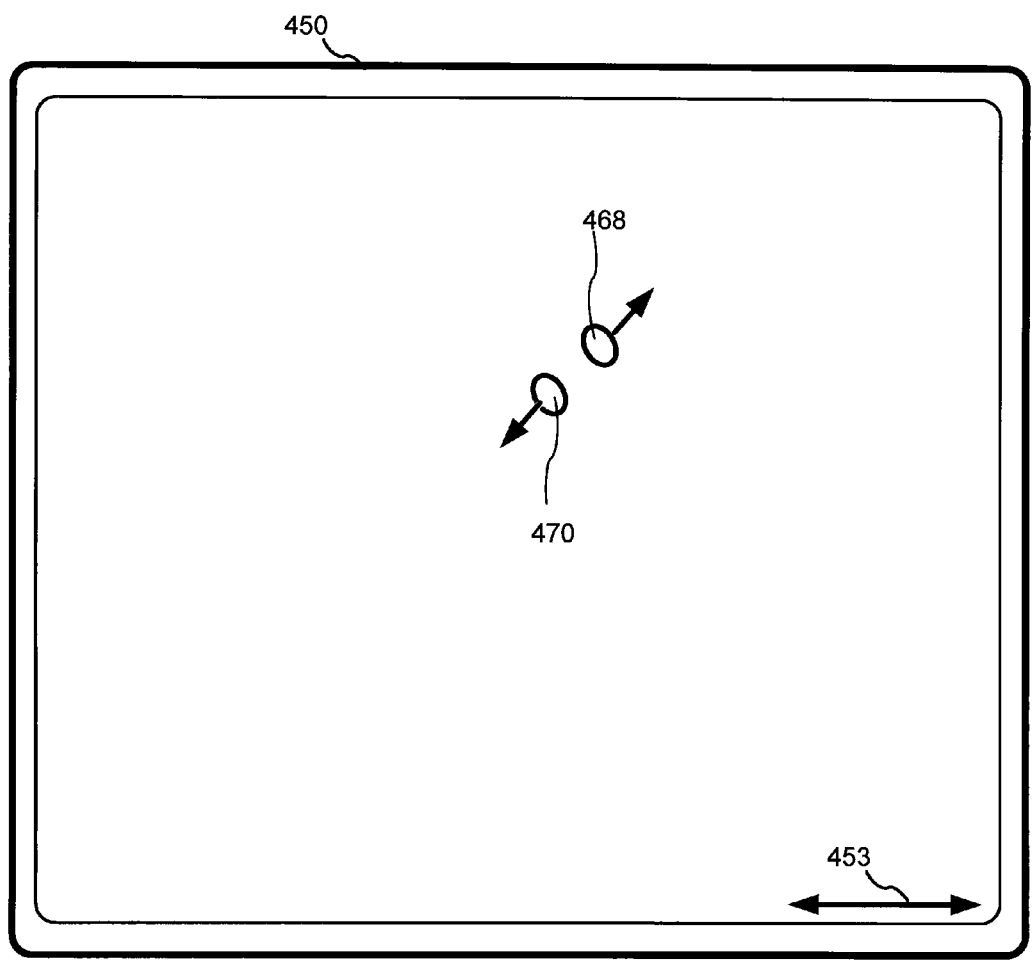
FIG. 4C illustrates an exemplary user interface for a multifunction device with a touch-sensitive surface that is separate from the display in accordance with some embodiments.
Figure 4C:
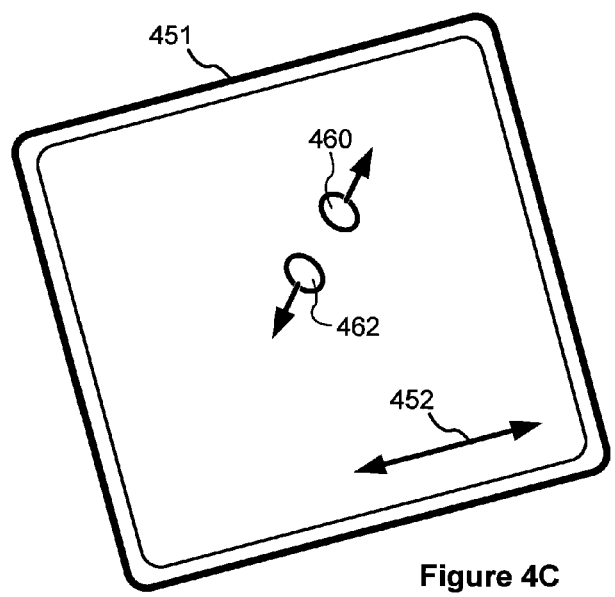

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on a touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462) detected by the device on the touch-sensitive surface (e.g., 451 in FIG. 4C) are used by the device to manipulate the user interface on the display (e.g., 450 in FIG. 4C) of the multifunction device when the touch-sensitive surface and the display are separate. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

FIGS. 5A-5K illustrate exemplary user interfaces for touch-based gestural input on an electronic canvas in accordance with some embodiments. The user interfaces in these figures are used to illustrate the processes described below, including the processes in FIGS. 6A-6C.

In FIGS. 5A-5K, some finger contact movement sizes, as well as predefined distance thresholds, may be grossly exaggerated for illustrative purposes. No depiction in the figures bearing on predefined distance thresholds or finger contact movements should be taken as a requirement or limitation for the purpose of understanding sizes and scale associated with the methods and devices disclosed herein.

Figure 5A:
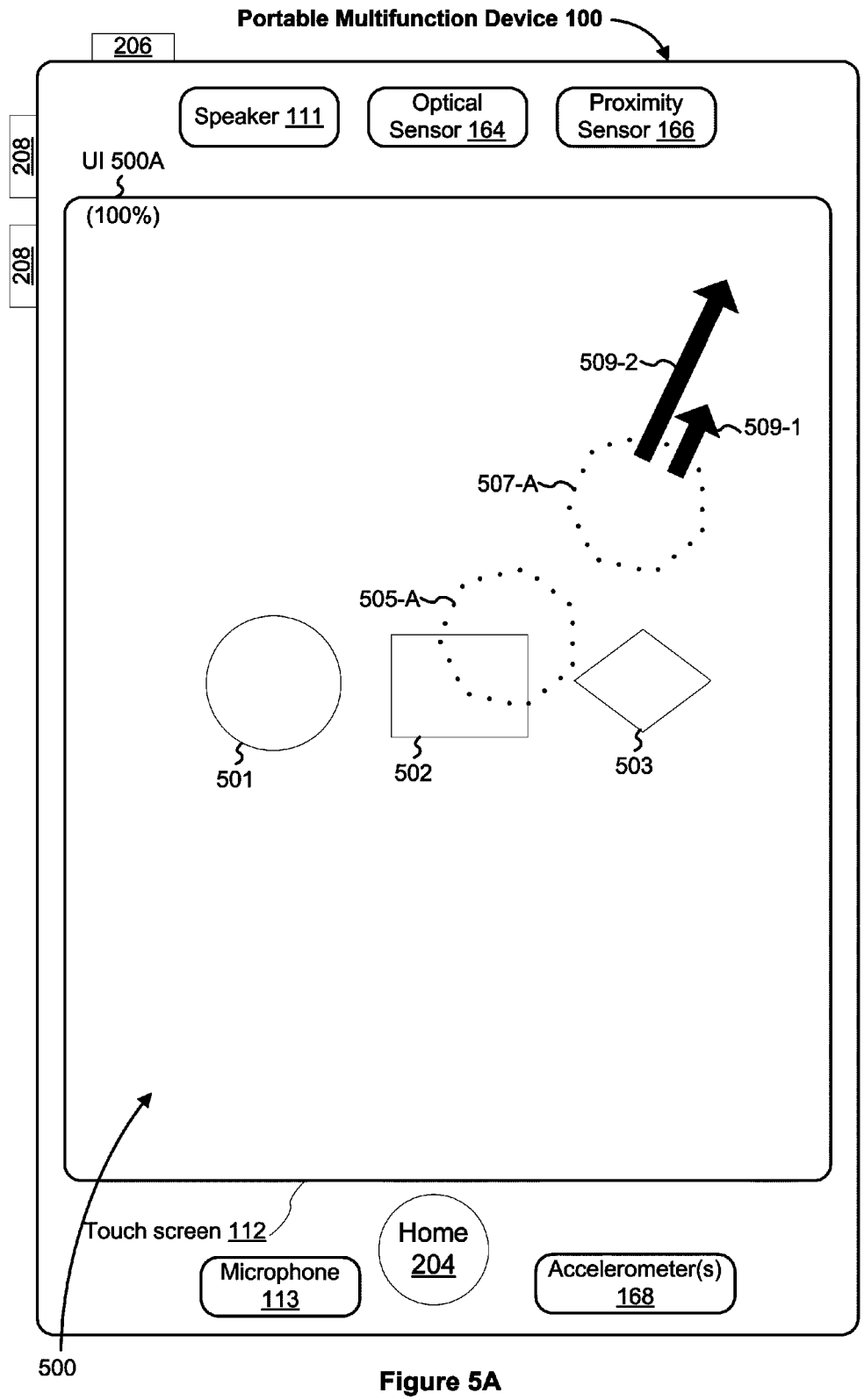
FIGS. 5A-5K illustrate exemplary user interfaces for touch-based gestural command input in accordance with some embodiments.

UI 500A (FIG. 5A) depicts an exemplary user interface displaying an electronic canvas 500 on the touch screen 112 at a first magnification level of 100% (i.e., 1.0× magnification, and for clarity, reference designator UI 500A in FIG. 5A is displayed in conjunction with a parenthetical indicating the electronic canvas 500 is displayed at 100% magnification). The displayed electronic canvas 500 includes three displayed objects: a circle 501, a rectangle 502, and a diamond 503. In this example, the displayed electronic canvas 500 is part of a drawing program, and the objects are configured to be manipulated within the drawing program.

UI 500A also illustrates a simultaneous detection of a first contact 505-A and a second contact 507-A on the touch screen 112. In this example, the first contact 505-A is at a location on the touch screen 112 corresponding to the rectangle 502, while the second contact 507-A is at a location on the touch screen 112 corresponding to a location that is away from (i.e., not touching) the rectangle 502.

UI 500A also depicts a two-finger depinch gesture 509 made with a first contact 505-A and a second contact 507-A. Two alternative depinch gestures 509-1 and 509-2 are depicted corresponding to different movements of the second contact 507-A (each movement being depicted by a respective arrow symbol). The depinch movement 509-1 is a movement of the second contact 507-A with a first velocity (the shorter arrow). The depinch movement 509-2 is also a movement of the second contact 507-A, but with a second velocity (the longer arrow) that is greater than the first velocity of the depinch movement 509-1. In the illustrated embodiments, the two-finger depinch gesture is used to transition or "jump" the magnification of the electronic canvas 500 to a predefined magnification level or to scale the electronic canvas in accordance with the two-finger depinch gesture, the particular action in response to the depinch gesture being performed by the device 100 based on the velocity of movement of the second contact 507-A.

Figure 5B:
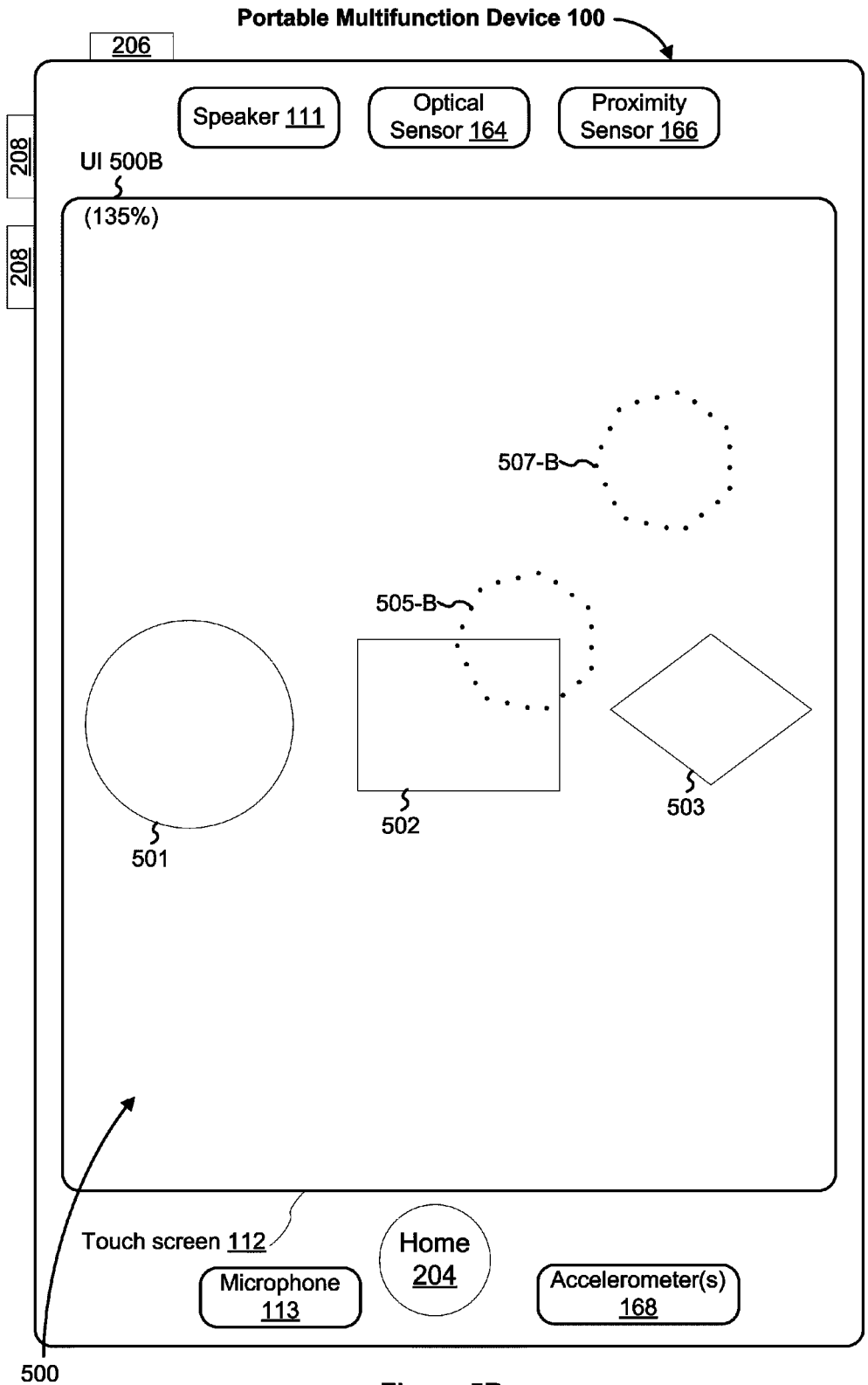
Figure 5C:
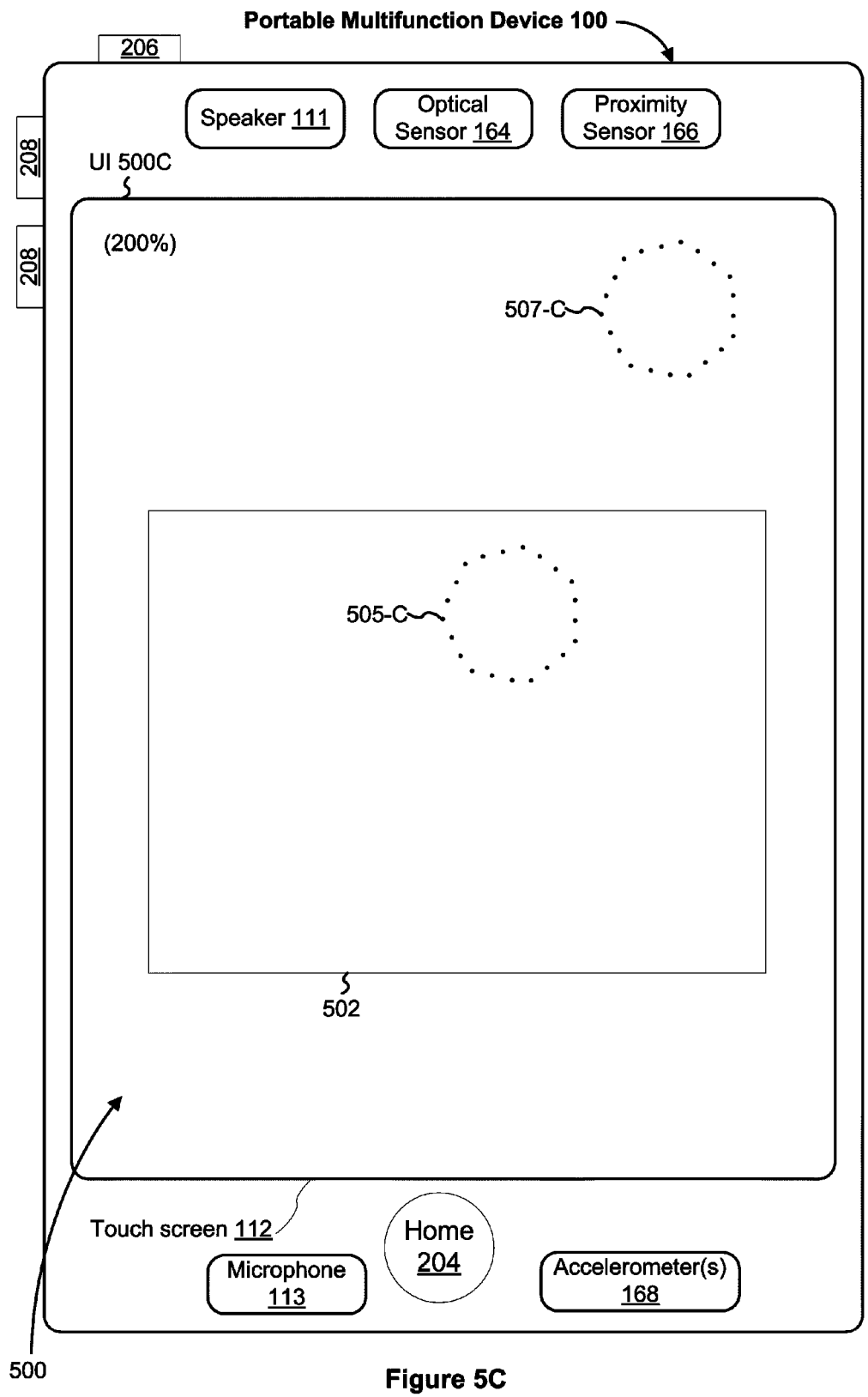

In the examples illustrated in FIGS. 5A-5C, the velocities of the movements 509-1 and 509-2 forming depinch gesture 509 are compared to a predefined gesture velocity threshold, which may be defined as a constant.

The results of the depinch movement 509-1 and depinch movement 509-2 are illustrated in FIGS. 5B and 5C, respectively.

UI 500B (FIG. 5B) illustrates the electronic canvas 500 in response to a depinch gesture 509 that includes the movement 509-1 (FIG. 5A) of the second contact 507-A (FIG. 5A), where the movement 509-1 has a first velocity that is less than a predefined gesture velocity threshold. As a result, the electronic canvas 500 is gradually scaled in accordance with the depinch gesture 509. In this example, in response to the depinch gesture 509 that includes the movement 509-1 of the second contact 507-A, the electronic canvas 500 is scaled to a new magnification level of 135% (for clarity, a parenthetical value is shown on the UI 500B indicating the electronic canvas 500 is displayed at 135% magnification; this value may or may not be shown on the UI 500B). UI 500B also illustrates that, in this example, the first contact 505-B and the second contact 507-B are still on the touch screen 112, and in light of movement 509-1, the second contact 507-B has moved to a new position on touch screen 112.

UI 500C (FIG. 5C) illustrates the electronic canvas 500 in response to a depinch gesture 509 that includes the movement 509-2 (FIG. 5A) of the second contact 507-A (FIG. 5A), where the movement 509-2 has a second velocity that is greater than the predefined gesture velocity threshold. As a result, the electronic canvas 500 is magnified to a predefined magnification level in response to depinch gesture 509. In this example, in response to the depinch gesture 509 that includes the movement 509-2 of the second contact 507-A, the electronic canvas 500 is transitioned or "jumped" to a new magnification level of 200%, which is a predefined magnification level (for clarity, a parenthetical value is shown on the UI 500C indicating the electronic canvas 500 is displayed at 200% magnification). Magnification of the electronic canvas 500 to a predefined magnification level in response to a pinch or depinch gesture that includes a velocity greater than or equal to a predefined gesture velocity threshold may be referred to as a "ballistic pinch."

Ballistic pinches and depinches may be used in succession to transition through a series of predefined magnification levels, such as 25%, 50%, 75%, 100%, 200%, etc., or through a hierarchical series of predefined magnification levels, (e.g. in a map application, transitioning through hierarchical map zoom levels selected from a group consisting of block, street, neighborhood, city, county, state, country, and continent).

UI 500C also illustrates, that in this example, the first contact 505-C and second contact 507-C are still on the touch screen 112.

Figure 5D:
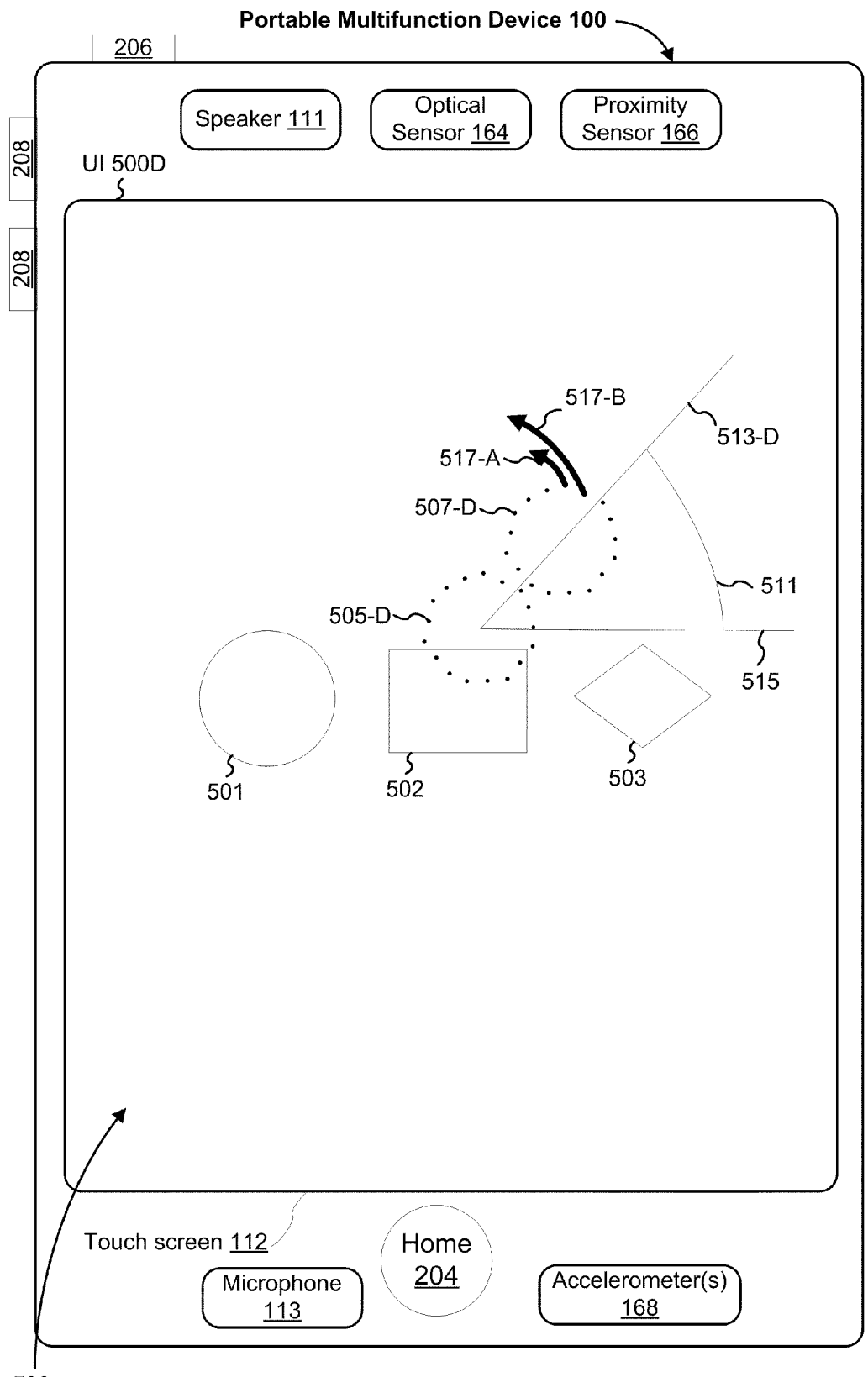
Figure 5E:
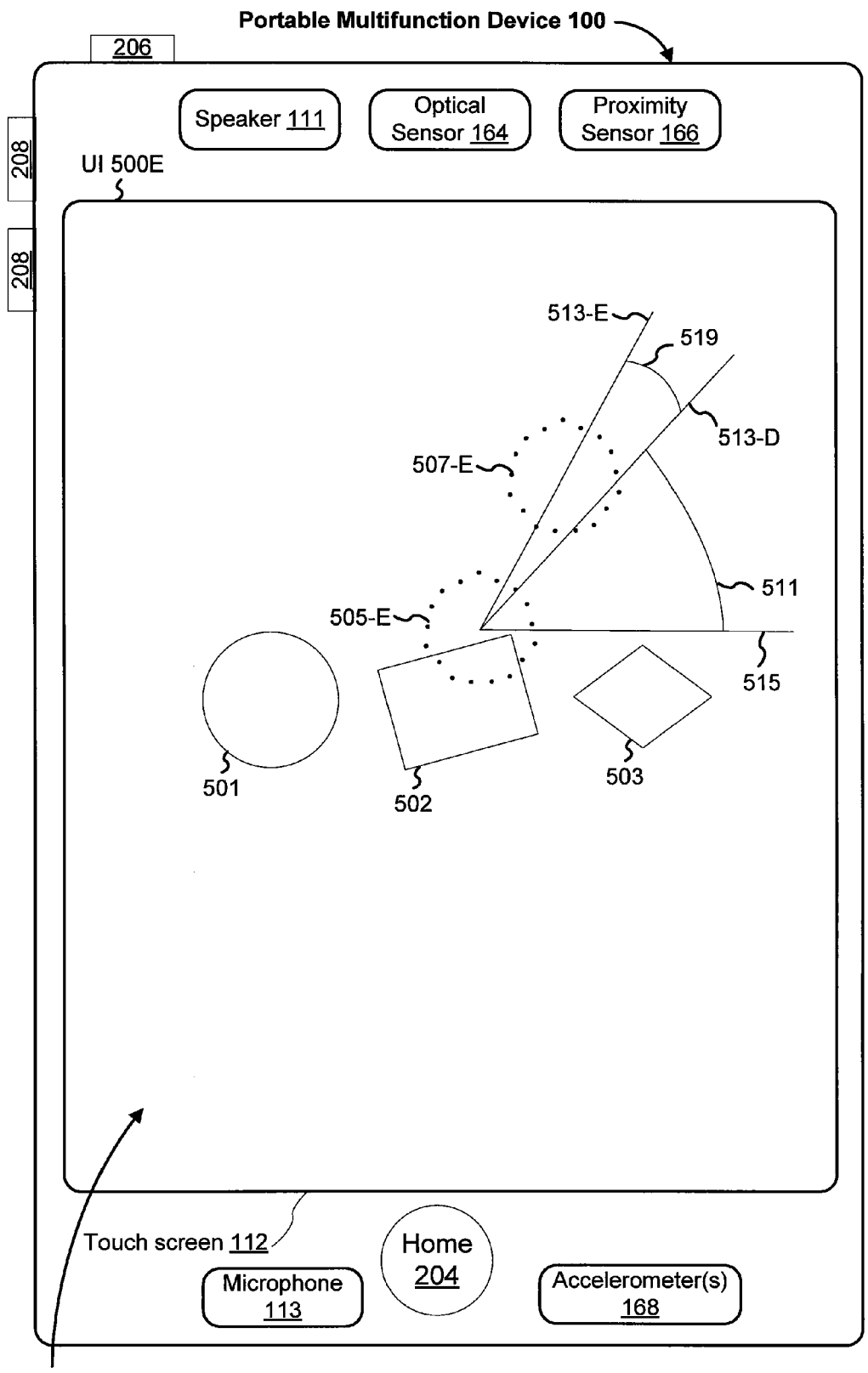
Figure 5F:
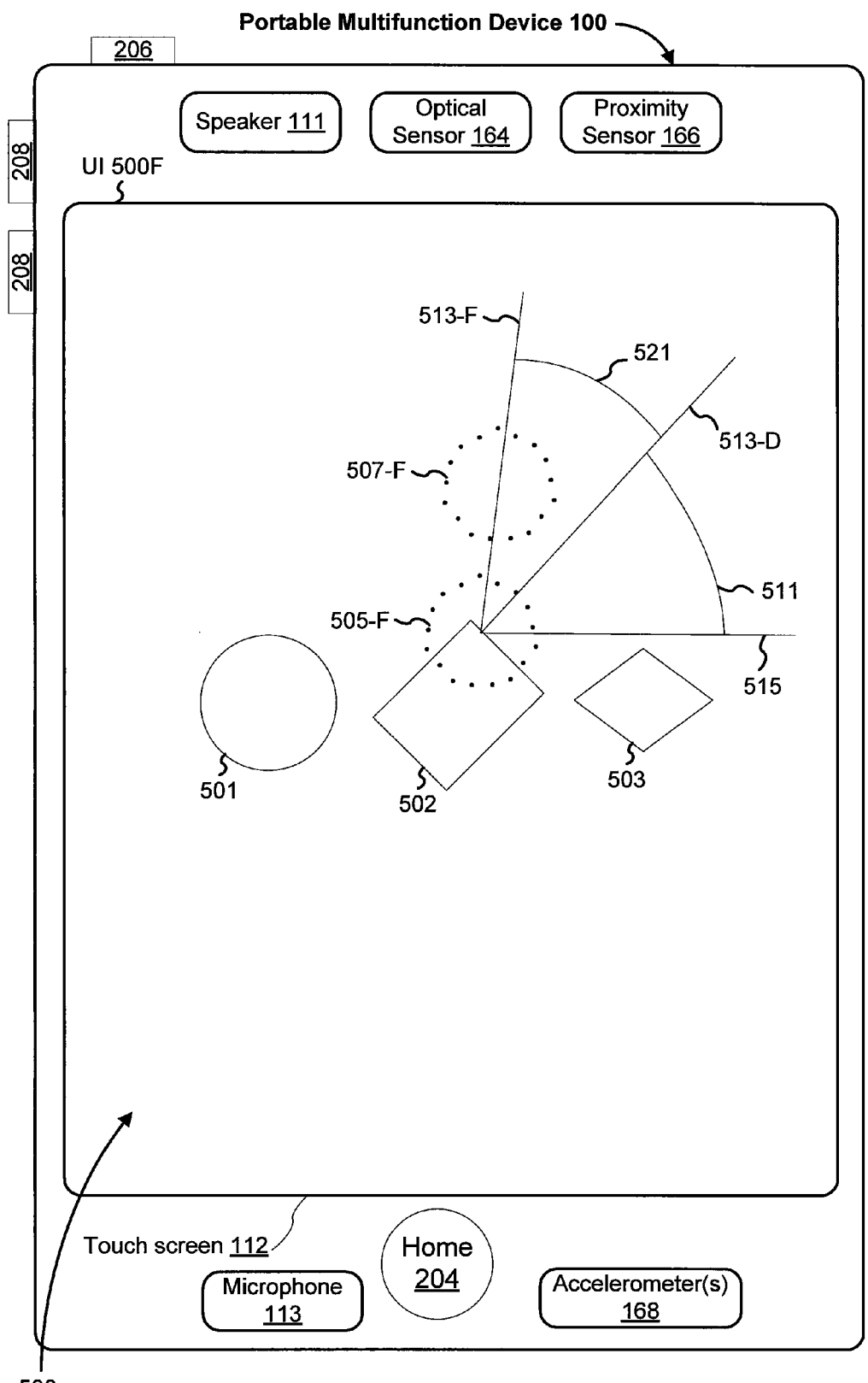

As FIGS. 5A-5C illustrated scaling and magnification gestures, FIGS. 5D-5F illustrate rotation gestures that may be used independently or in conjunction with the scaling and magnification gestures of FIGS. 5A-5C.

In UI 500D (FIG. 5D), the electronic canvas 500 is again displayed without magnification. The first contact 505-D and the second contact 507-D are still on the touch screen 112. In addition, the first contact 505-D remains at a location on the touch screen 112 corresponding to the rectangle 502, while the second contact 507-D is at a location on the touch screen 112 corresponding to a location that is away from (i.e., not touching) rectangle 502. An initial angle 511 is calculated between: 1) an axis 513-D between the first contact 505-D and the second contact 507-D; and, 2) an axis 515 corresponding to the touch screen 112. As described below, the initial angle 511 is used in relation to performing rotate gestures.

UI 500D also illustrates a two-finger gesture 517 made with the first contact 505-D and the second contact 507-D. The gesture 517, in this example, is a rotate gesture where the second contact 507-D is depicted with two alternate movements to form the gesture 517. The rotate movement 517-A is a movement of the second contact 507-D with a first angular rotation value. Similarly, the rotate movement 517-B is a rotate movement of the second contact 507-D with a second angular rotation value that, as illustrated in UI 500D, rotates farther than the rotate movement 517-A.

In the examples illustrated in FIGS. 5D-5F, rotation movements 517-A and 517-B forming the rotate gesture 517 are used to calculate rotation angles between the initial angle 511 and a current angle (not labeled in FIG. 5D) formed by the new axis between the first contact 505-D and the second contact 507-D and axis 515 corresponding to touch screen 112. The rotation angles are compared to a first predefined angular rotation value and a second predefined angular rotation value, which is less than the first predefined angular rotation value, to determine what response to perform within the user interface in response to detecting rotate gesture 517.

The results of the rotate gesture 517 based on rotate movement 517-A, and the rotate gesture 517 based on the rotate movement 517-B, are illustrated in FIGS. 5E and 5F, respectively.

UI 500E (FIG. 5E) illustrates that when the calculated rotation angle 519, as established by rotate gesture 517 based on rotate movement 517-A, and thus axis 513-E, is between the first predefined angular rotation value and the second predefined angular rotation value, rectangle 502 is rotated by the calculated rotation angle 519 on the electronic canvas. In other words, the object being moved rotates in what appears to be "free rotation" to a user, and rotates in accordance with the user's gesture movement on the touch screen 112.

As a result, in UI 500E, the rectangle 502 has been rotated counter-clockwise in an amount corresponding to calculated rotation angle 519 from its original orientation in UI 500D.

UI 500F (FIG. 5F) illustrates that when the calculated rotation angle 521, as established by rotate gesture 517 based on the rotate movement 517-B, and thus axis 513-F, is greater than or equal to the second predefined angular rotation value, the rectangle 502 is rotated on the electronic canvas 500 in predefined rotational increments in accordance with the first gesture (e.g., 45° per rotation movement of the displayed object on the electronic canvas). In other words, the displayed object rotates in even, set amounts in accordance with the user's gesture movement on the touch screen 112.

As a result, in UI 500F, the rectangle 502 has been rotated counter-clockwise to an axis 45° from its original orientation in UI 500D.

UI 500G (FIG. 5G) illustrates that the second contact 507 has been removed from touch screen 112, while the first contact 505-G remains in contact with the touch screen 112 and corresponds to the location of rectangle 502 on the electronic canvas.

UI 500G also illustrates a movement gesture 523 with the first contact 505-G on the touch screen 112.

UI 500H (FIG. 5H) illustrates that, in response to detecting a movement gesture 523 on the touch screen 112, the electronic canvas 500 was panned in accordance with the movement gesture 523 of first contact 505-G to the position illustrated in UI 500H (i.e., the objects 501, 502, and 503 have moved upwards and to the right on the electronic canvas 500 in UI 500H with respect to their positions on the electronic canvas 500 in UI 500G). In some embodiments, such as in this example, the first contact must move on the touch screen 112 or touch sensitive surface more than a predefined distance in order for the electronic canvas 500 to be panned. In some embodiments, the first contact must move on the touch screen 112 or touch sensitive surface at least as far as the predefined distance in order for the electronic canvas 500 to be panned.

UI 500H also illustrates that after the electronic canvas 500 was panned, the first contact 505-H continues to touch the displayed rectangle 502 for at least a first predefined time interval, and in response, the rectangle 502 is selected (i.e., a focus is placed on the rectangle 502). For clarity, exemplary attachment handles 502-a and 502-b are shown in UI 500H to indicate that the rectangle 502 is selected.

UI 500I (FIG. 5I) illustrates that the first contact 505-I continues to touch the displayed rectangle 502 for at least a second predefined time interval greater than the first predefined time interval, and in response, the context menu 525 is displayed. The context menu 525 may include any appropriate material, including information about a given displayed object, commands to invoke different functions within the user interface, e.g., arrangement of objects, creation of new objects, editing of attributes of displayed objects, alteration of, entry to, or exit from programmatic or display modes, etc.

UI 500I also illustrates a movement gesture 527 made with the first contact 505-I.

UI 500J (FIG. 5J) illustrates that in response to detecting that the movement gesture 527 moved on the touch screen 112 more than a predefined distance, the display of the context menu 525 is terminated, and the rectangle 502 is moved on the electronic canvas 500 in accordance with the movement gesture 527.

Note that, as illustrated by exemplary attachment handles 502-a and 502-b, the rectangle 502 remains selected. UI 500J also illustrates a movement gesture 529 made with first contact 505-J.

UI 500K (FIG. 5K) illustrates that in response to detecting that movement gesture 529 moved on touch screen 112 more than a predefined distance, the rectangle 502 is moved on the electronic canvas 500 in accordance with the movement gesture 529. UI 500K also illustrates that first contact 505 has been lifted off of touch screen 112 and rectangle 502 is no longer selected.

Figure 6A:
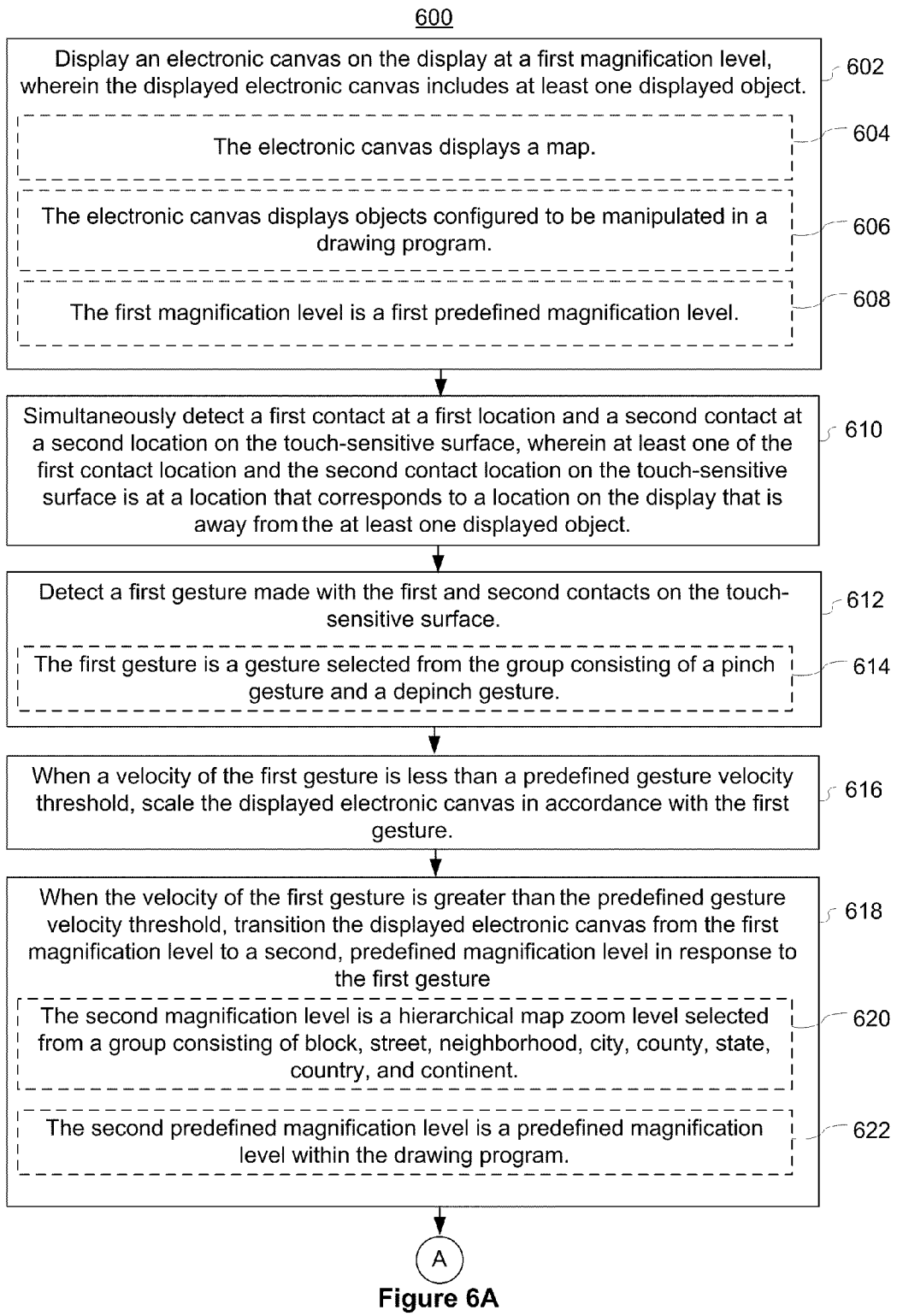

FIGS. 6A-6C are flow diagrams illustrating a method 600 of touch-based gestural input on an electronic canvas in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive interface for touch-based gestural command input using predefined movement and time thresholds to disambiguate desired user interface touch command gestures for electronic canvases. The method reduces the cognitive burden on a user when using user interfaces for touch-based gestural input on an electronic canvas, thereby creating a more efficient human-machine interface. For battery-operated computing devices, enabling a user to interact with displayed objects on an electronic canvas faster and more efficiently conserves power and increases the time between battery charges.

The device displays (602) an electronic canvas on the display at a first magnification level, wherein the displayed electronic canvas includes at least one displayed object (e.g., in FIG. 5A, UI 500A illustrates a displayed electronic canvas 500 that includes three displayed objects: a circle 501, a rectangle 502, and a diamond 503 at a first magnification level of 100%).

In some embodiments, the electronic canvas displays a map (604).

In some embodiments, the electronic canvas displays objects configured to be manipulated in a drawing program, presentation program, or any other suitable software application (606) (e.g., in FIG. 5A, UI 500A illustrates a displayed electronic canvas 500 including three displayed objects: a circle 501, a rectangle 502, and a diamond 503 within a drawing program, and the objects are configured to be manipulated within the drawing program).

In some embodiments, the first magnification level is a first predefined magnification level (e.g., in FIG. 5A, UI 500A illustrates displayed electronic canvas 500 at 1.0× magnification, i.e., 100% magnification, and in some systems, 1.0× magnification is a predefined magnification level) (608).

The device simultaneously detects (610) a first contact at a first location and a second contact at a second location on the touch-sensitive surface, wherein at least one of the first contact location and the second contact location on the touch-sensitive surface is at a location that corresponds to a location on the display that is away from (i.e., not touching) the at least one displayed object (e.g., in FIG. 5A, UI 500A illustrates a simultaneous detection of a first contact 505-A and a second contact 507-A on the touch screen 112, and the second contact 507-A is at a location on the touch screen 112 corresponding to a location that is away from (i.e., not touching) rectangle 502).

The device detects (612) a first gesture made with the first and second contacts on the touch-sensitive surface (e.g., in FIG. 5A, UI 500A depicts a two-finger depinch gesture 509 made with first contact 505-A and second contact 507-A). As used here, a gesture made with the first and second contacts on the touch-sensitive surface requires movement of at least one of the first and second contacts on the touch-sensitive surface. Thus, a gesture may be made with the motion of a first contact, or the motion of a second contact, or the motion of both the first and the second contacts to be considered a gesture made with the first and second contacts on the touch-sensitive surface.

In some embodiments, the first gesture is a gesture selected from the group consisting of a pinch gesture and a depinch gesture (i.e., a two-finger gesture) (614) (e.g., in FIG. 5A, UI 500A illustrates a two-finger depinch gesture 509 made with a first contact 505-A and a second contact 507-A).

When a velocity of the first gesture is less than a predefined gesture velocity threshold, the device scales (616) the displayed electronic canvas in accordance with the first gesture (e.g., in FIG. 5B, UI 500B illustrates that, in response to a depinch gesture 509 that includes the movement 509-1 of a second contact 507-A with a first velocity, the electronic canvas 500 is scaled in accordance with the depinch gesture 509 because the velocity of the movement 509-1 is less than the predefined gesture velocity threshold).

In some embodiments, the gesture velocity, or rate of movement threshold, is calculated by dividing the distance moved by one or more of the contacts by the duration of the movement(s), and determining that the value is greater than a predefined constant such as 750, which may be set as the predefined gesture velocity threshold. The determination of gesture velocity may use the movement of one contact, both contacts, the rate at which the contacts separate or approach one another, etc. The predefined gesture velocity threshold is established as a numerical constant to compare against the velocity of the gesture (e.g., 500, 750, 1000, etc., or any suitable value).

In some embodiments, the velocity of the first gesture is measured at the beginning of the first gesture. In some embodiments, the velocity of the first gesture is measured in the middle of the first gesture. In some embodiments, the velocity of the first gesture is measured at the end of the first gesture. In some embodiments, the velocity of the first gesture is an average velocity measured during the first gesture.

In some embodiments, the entire displayed electronic canvas is scaled in accordance with the first gesture. In some embodiments, a selected, displayed object on the canvas is scaled in accordance with the first gesture if both contacts are on the object.

When the velocity of the first gesture is greater than or equal to the predefined gesture velocity threshold, the device transitions (618) the displayed electronic canvas from the first magnification level to a second, predefined magnification level in response to the first gesture (e.g., in FIG. 5C, UI 500C illustrates that, in response to a depinch gesture 509 that includes the movement 509-2 of a second contact 507-B with a second velocity that is greater than the predefined gesture velocity threshold, the electronic canvas 500 is magnified in response to depinch gesture 509 to a predefined magnification level of 200%).

In some embodiments, the second magnification level is a hierarchical map zoom level selected from a group consisting of block, street, neighborhood, city, county, state, country, and continent (620).

In some embodiments, the second predefined magnification level is a predefined magnification level within the drawing program (e.g., 100% and 200%, as shown in FIGS. 5A and 5C). In some embodiments, the second predefined magnification level may be any suitable value, including 25%, 50%, 75%, 100%, 150%, 200%, etc.

In some embodiments, when at least one of the first contact location and the second contact location on the touch-sensitive surface is at a location that corresponds to a location on the display that is on (e.g. at least one contact is touching) the at least one displayed object (624), the operations in the following paragraph may be performed in lieu of, or in conjunction with, the operations of method 600 discussed above.

In response to detecting the first contact and the second contact by the user on the touch-sensitive surface, the device calculates an initial angle between an axis between the first contact and the second contact and an axis corresponding to the touch-sensitive surface (e.g., in FIG. 5D, UI 500D illustrates that the initial angle 511 is calculated between: 1) an axis 513-D between the first contact 505-D and the second contact 507-D; and, 2) an axis 515 corresponding to the touch screen 112); while detecting the first gesture, the device calculates a rotation angle between the initial angle and a current angle formed between the axis between the first contact and the second contact and the axis corresponding to the touch-sensitive surface; when the rotation angle is less than a first predefined angular rotation value (e.g., 1°, 2°, 3° or any suitable rotation value) the device maintains the displayed object at an orientation corresponding to the initial angle (i.e., the object is not rotated); and when the rotation angle is between the first predefined angular rotation value and a second predefined angular rotation value (e.g., 3°, 4°, 5° or any suitable rotation value), the device rotates the displayed object by the calculated rotation angle on the electronic canvas (e.g., in FIG. 5E, UI 500E illustrates that when the calculated rotation angle 519, as established by rotate gesture 517 based on rotate movement 517-A, and thus axis 513-E, is between the first predefined angular rotation value and the second predefined angular rotation value, the rectangle 502 is rotated by the calculated rotation angle 519 on the electronic canvas); and when the rotation angle is greater than or equal to the second predefined angular rotation value, the device rotates the displayed object in predefined rotational increments in accordance with the first gesture (e.g., FIG. 5F, UI 500F illustrates that when the calculated rotation angle 521, as established by rotate gesture 517 based on rotate movement 517-B, and thus axis 513-F, is greater than or equal to the second predefined angular rotation value, rectangle 502 is rotated on the electronic canvas 500 in predefined rotational increments in accordance with the first gesture).

In some embodiments, when the current angle exceeds the first predefined angular rotation value, the device returns the electronic canvas to the first magnification level (626). In some embodiments, when the current angle is between the first predefined angular rotation value and a second predefined angular rotation value, the device returns the electronic canvas to the first magnification level.

In some embodiments, once the calculated rotation angle has exceeded the second predefined angular rotation value, the displayed object is rotated in predefined rotational increments in accordance with the first gesture even if the calculated rotation angle falls below the second predefined angular rotation value (628).

Figure 5G:
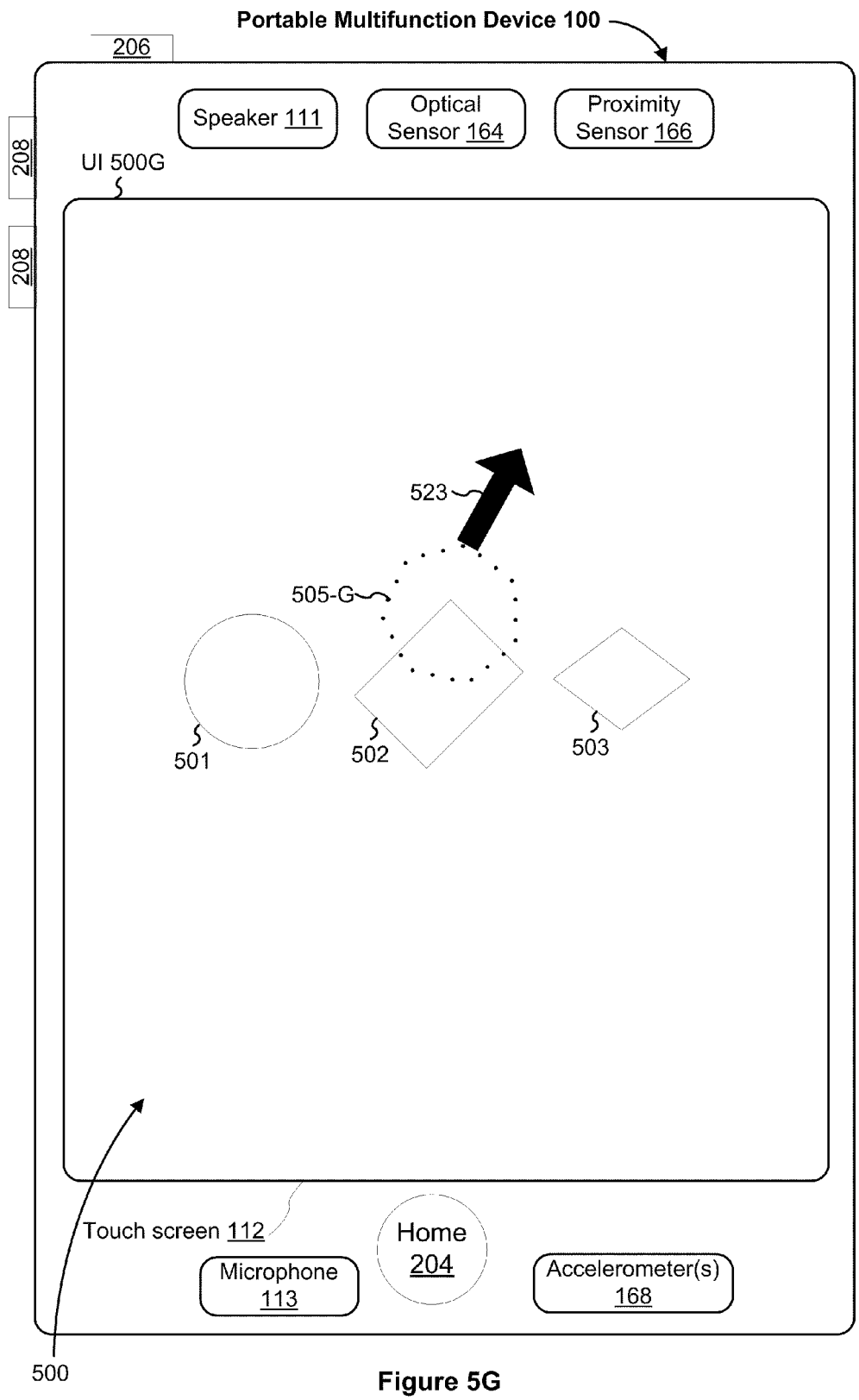

In some embodiments, when the electronic canvas has been scaled in accordance with the first gesture to exceed a threshold scaling amount, the device maintains (630) the displayed object at an orientation corresponding to the initial angle independent of, or regardless of, the calculated rotation angle In some embodiments, the device detects liftoff of the second contact from the touch-sensitive surface, and detects that the first contact touches a location on the touch-sensitive surface corresponding to the at least one displayed object on the electronic canvas (632) (e.g., in FIG. 5G, UI 500G illustrates that second contact 507 has been removed from touch screen 112, while first contact 505-G remains in contact with the touch screen 112 and corresponds to the location of rectangle 502 on the electronic canvas).

Figure 5H:
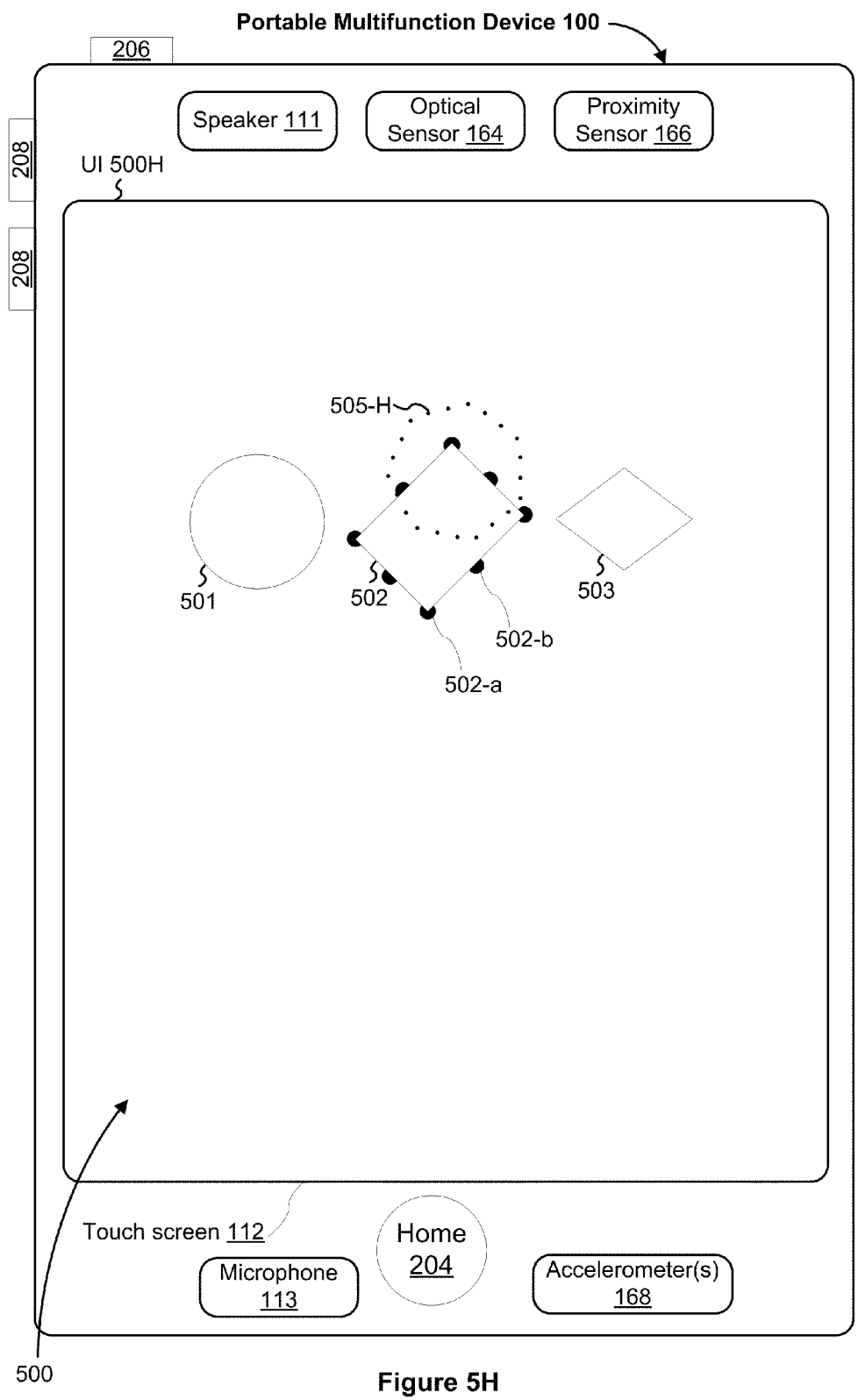

In some embodiments, the device selects (i.e., places a focus on) the at least one displayed object when the first contact continues to touch the at least one displayed object for at least a first predefined time interval (634) (e.g., in FIG. 5H, UI 500H illustrates that the first contact 505-H continued to touch displayed rectangle 502 for at least a first predefined time interval, and in response, rectangle 502 was selected). The first predefined time interval may be any suitable predefined time period (e.g., 0.15 seconds, 0.2 seconds, 0.3 seconds, 0.35 seconds, etc.).

Figure 5I:
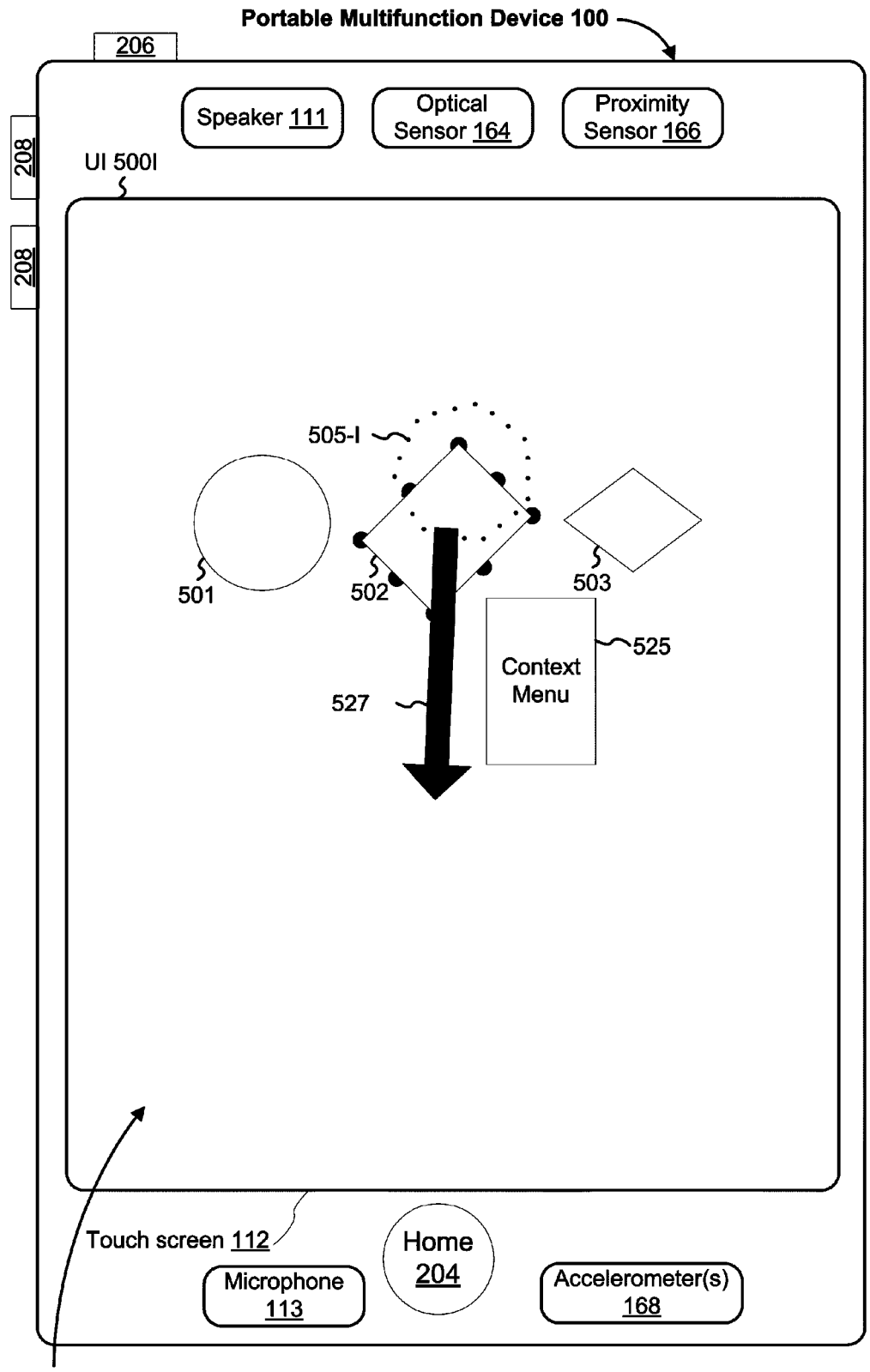

In some embodiments, the device displays a context menu (e.g., for the at least one displayed object) on the electronic canvas in response to detecting that the first contact touches a location on the touch-sensitive surface corresponding to the at least one displayed object for at least a second predefined time interval, wherein the second predefined time interval is greater than the first predefined time interval (636) (e.g., in FIG. 5I, UI 500I illustrates that the first contact 505-I continues to touch the displayed rectangle 502 for at least a second predefined time interval greater than the first predefined time interval, and in response, the context menu 525 is displayed). The second predefined time interval may be any suitable predefined time period (e.g., 0.5 seconds, 0.75 seconds, 0.8 seconds, 0.9 seconds, etc.).

Figure 5J:
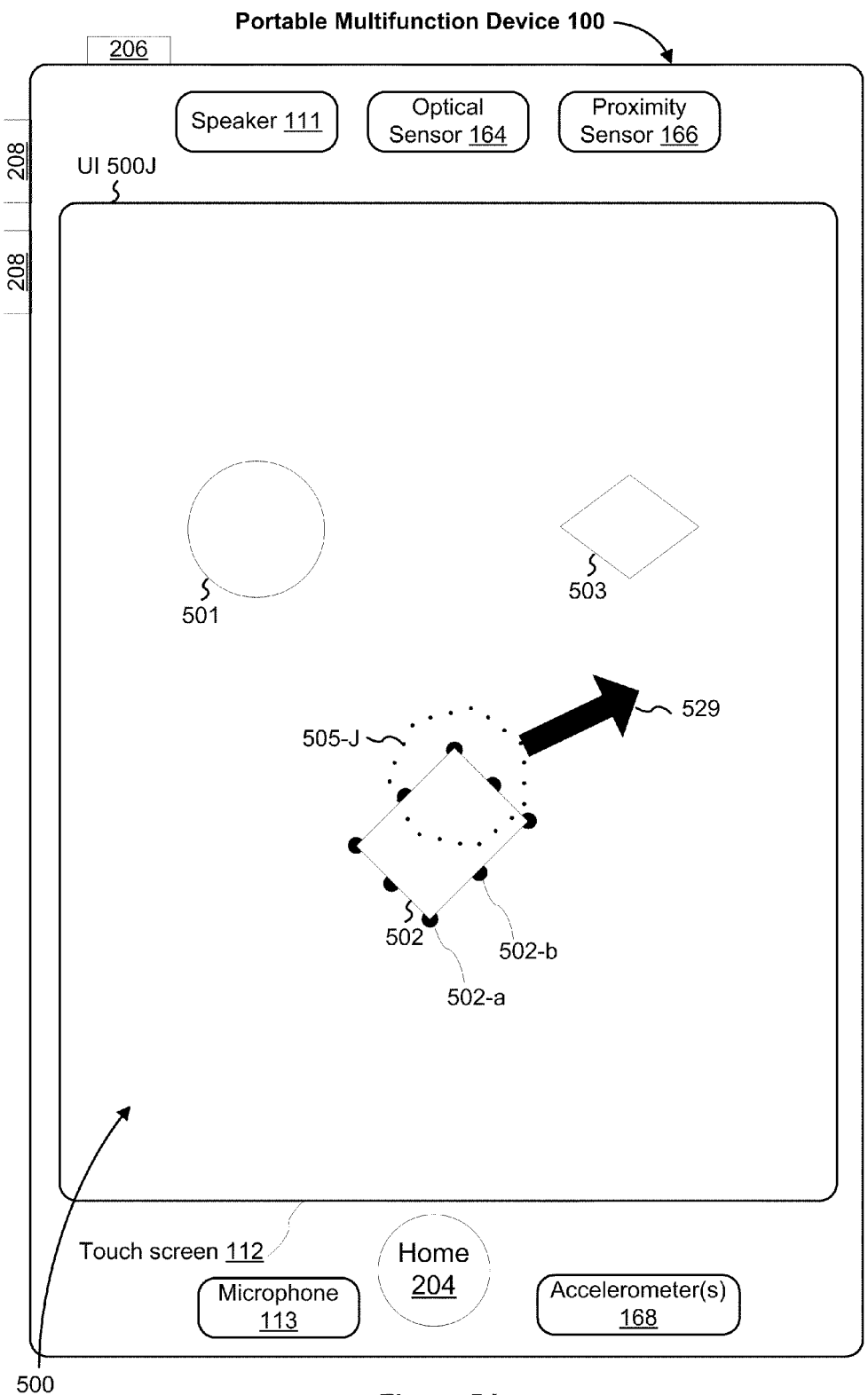

In some embodiments, the device detects a fourth gesture made with the first contact on the touch sensitive surface that moves on the touch sensitive surface more than a predefined distance, and in response, the device ceases to display the context menu and, moves the at least one displayed object on the electronic canvas in accordance with the fourth gesture (638) (e.g., in FIG. 5I, UI 500I illustrates a movement gesture 527 made with first contact 505-I; in FIG. 5J, UI 500J illustrates that in response to detecting that movement gesture 527 moved on touch screen 112 more than a predefined distance, display of the context menu 525 is terminated, and the rectangle 502 is moved on the electronic canvas 500 in accordance with the movement gesture 527). The predefined distance may be any suitable predefined distance (e.g., 10 pixels, 11 pixels, 12 pixels, 13 pixels, 14 pixels, 15 pixels, etc.).

Figure 5K:
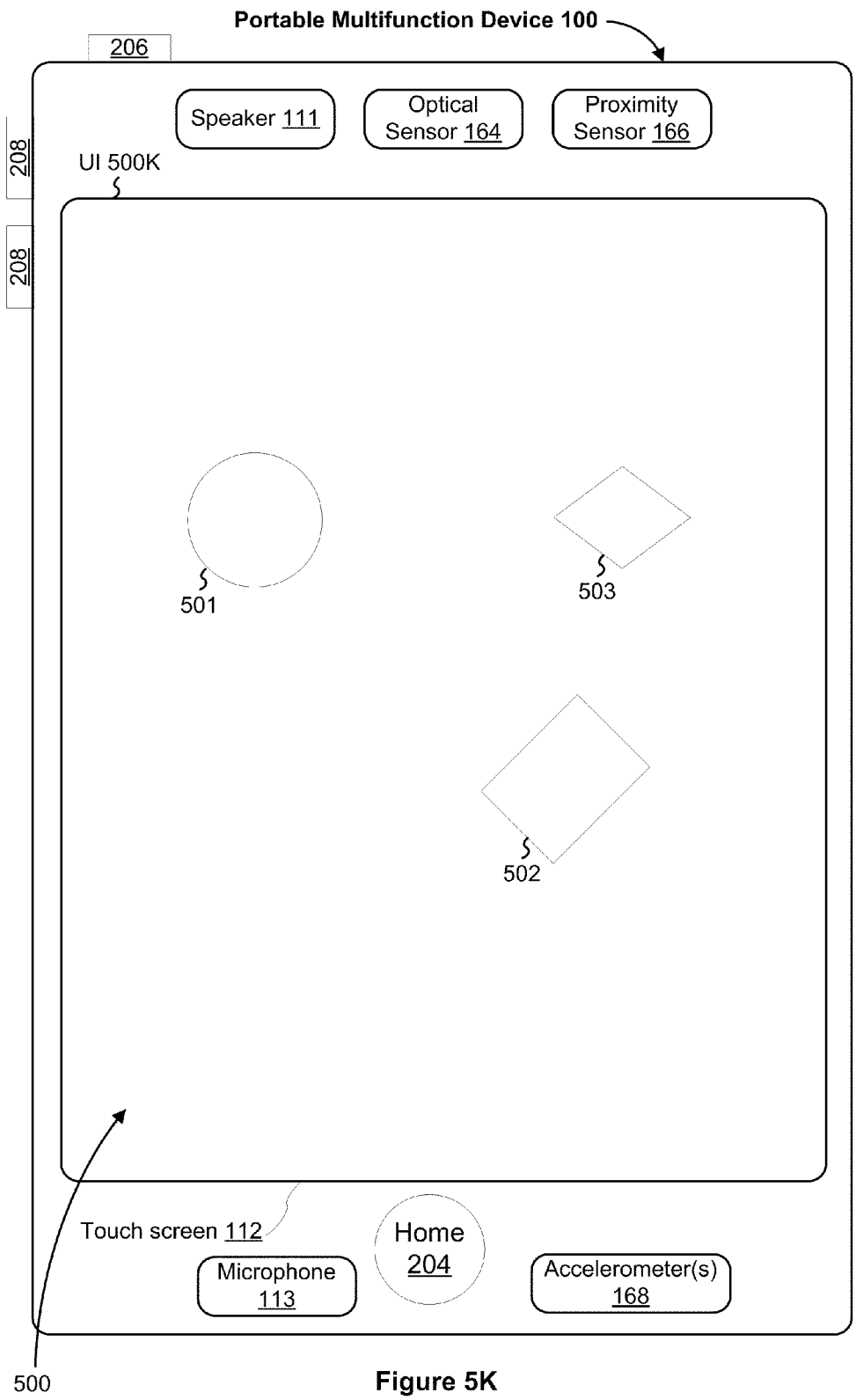

In some embodiments, the device detects a third gesture made with the first contact on the touch sensitive surface, and in response, the device moves the at least one displayed object on the electronic canvas in accordance with the third gesture when the third gesture moves on the touch sensitive surface more than a predefined distance (640) (e.g., in FIG. 5J, UI 500J also illustrates a movement gesture 529 made with first contact 505-J, and in FIG. 5K, UI 500K illustrates that in response to detecting that movement gesture 529 moved on touch screen 112 more than a predefined distance, rectangle 502 is moved on the electronic canvas 500 in accordance with the movement gesture 529). As noted above, the predefined distance may be any suitable predefined distance (e.g., 10 pixels, 11 pixels, 12 pixels, 13 pixels, 14 pixels, 15 pixels, etc.).

In some embodiments, after detecting liftoff of the second contact from the touch-sensitive surface, the device detects a second gesture made with the first contact on the touch sensitive surface; and the device pans the electronic canvas on the display in accordance with the second gesture when the first contact moves on the touch sensitive surface more than a predefined distance (642) (e.g., in FIG. 5G, UI 500G illustrates that second contact 507 has been removed from touch screen 112 and movement gesture 523 with first contact 505-G on touch screen 112; in FIG. 5H, UI 500H illustrates that in response to detecting movement gesture 523 on the touch screen 112, the electronic canvas 500 was panned in accordance with the movement gesture 523 of first contact 505-G). The predefined distance may be any suitable predefined distance (e.g., 10 pixels, 11 pixels, 12 pixels, 13 pixels, 14 pixels, 15 pixels, etc.).

In some embodiments, the device scrolls, with inertia derived from the velocity of the second gesture, the electronic canvas on the display in accordance with the second gesture when a velocity of the second gesture is greater than or equal to a second predefined gesture velocity threshold In some embodiments, the gesture velocity is detected within a predefined time interval prior to detecting liftoff of the first contact from the touch-sensitive surface.

In some embodiments, the first and second predefined gesture velocity thresholds are the same value.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a multifunction device with a display and a touch-sensitive surface:
      displaying an electronic canvas on the display at a first magnification level, wherein the displayed electronic canvas includes at least one displayed object;
      simultaneously detecting a first contact at a first location and a second contact at a second location on the touch-sensitive surface, wherein at least one of the first contact location and the second contact location on the touch-sensitive surface is at a location that corresponds to a location on the display that is away from the at least one displayed object;
      detecting a first gesture made with the first and second contacts on the touch-sensitive surface;
      in accordance with a determination that a velocity of the first gesture is less than a predefined gesture velocity threshold, scaling the displayed electronic canvas in accordance with the first gesture; and
      in accordance with a determination that the velocity of the first gesture is greater than the predefined gesture velocity threshold, transitioning the displayed electronic canvas from the first magnification level to a second, predefined magnification level in response to the first gesture.

2. The method of claim 1, wherein at least one of the first contact location and the second contact location on the touch-sensitive surface is at a location that corresponds to a location on the display that is on the at least one displayed object, further comprising:
   in response to detecting the first contact and the second contact by the user on the touch-sensitive surface, calculating an initial angle between an axis between the first contact and the second contact and an axis corresponding to the touch-sensitive surface;
   while detecting the first gesture, calculating a rotation angle between the initial angle and a current angle formed between the axis between the first contact and the second contact and the axis corresponding to the touch-sensitive surface;
   when the rotation angle is less than a first predefined angular rotation value, maintaining the displayed object at an orientation corresponding to the initial angle;
   when the rotation angle is between the first predefined angular rotation value and a second predefined angular rotation value, rotating the displayed object by the calculated rotation angle on the electronic canvas; and
   when the rotation angle is greater than the second predefined angular rotation value, rotating the displayed object in predefined rotational increments in accordance with the first gesture.

3. The method of claim 2, wherein once the calculated rotation angle has exceeded the second predefined angular rotation value, the displayed object is rotated in predefined rotational increments in accordance with the first gesture even if the calculated rotation angle falls below the second predefined angular rotation value.

4. The method of claim 2, wherein when the current angle exceeds the first predefined angular rotation value, returning the electronic canvas to the first magnification level.

5. The method of claim 2, further comprising:
when the electronic canvas has been scaled in accordance with the first gesture to exceed a threshold scaling amount, maintaining the displayed object at an orientation corresponding to the initial angle independent of the calculated rotation angle.

6. The method of claim 1, further comprising:
detecting liftoff of the second contact from the touch-sensitive surface, and detecting that the first contact touches a location on the touch-sensitive surface corresponding to the at least one displayed object on the electronic canvas;
selecting the at least one displayed object when the first contact continues to touch the at least one displayed object for at least a first predefined time interval; and
displaying a context menu on the electronic canvas in response to detecting that the first contact touches a location on the touch-sensitive surface corresponding to the at least one displayed object for at least a second predefined time interval, wherein the second predefined time interval is greater than the first predefined time interval.

7. The method of claim 1, wherein the electronic canvas displays a map and the second magnification level is a hierarchical map zoom level selected from a group consisting of block, street, neighborhood, city, county, state, country, and continent.

8. The method of claim 1, wherein the electronic canvas displays objects configured to be manipulated in a drawing program.

9. A multifunction device, comprising:
a display;
a touch-sensitive surface;
one or more processors;
memory; and
one or more programs, wherein the one or more programs are stored in the memory and configured to be executed by the one or more processors, the one or more programs including instructions for:
displaying an electronic canvas on the display at a first magnification level, wherein the displayed electronic canvas includes at least one displayed object;
simultaneously detecting a first contact at a first location and a second contact at a second location on the touch-sensitive surface, wherein at least one of the first contact location and the second contact location on the touch-sensitive surface is at a location that corresponds to a location on the display that is away from the at least one displayed object;
detecting a first gesture made with the first and second contacts on the touch-sensitive surface;
in accordance with a determination that a velocity of the first gesture is less than a predefined gesture velocity threshold, scaling the displayed electronic canvas in accordance with the first gesture; and
in accordance with a determination that the velocity of the first gesture is greater than the predefined gesture velocity threshold, transitioning the displayed electronic canvas from the first magnification level to a second, predefined magnification level in response to the first gesture.

10. The multifunction device of claim 9, wherein at least one of the first contact location and the second contact location on the touch-sensitive surface is at a location that corresponds to a location on the display that is on the at least one displayed object, further comprising instructions for:
in response to detecting the first contact and the second contact by the user on the touch-sensitive surface, calculating an initial angle between an axis between the first contact and the second contact and an axis corresponding to the touch-sensitive surface;
while detecting the first gesture, calculating a rotation angle between the initial angle and a current angle formed between the axis between the first contact and the second contact and the axis corresponding to the touch-sensitive surface;
when the rotation angle is less than a first predefined angular rotation value, maintaining the displayed object at an orientation corresponding to the initial angle;
when the rotation angle is between the first predefined angular rotation value and a second predefined angular rotation value, rotating the displayed object by the calculated rotation angle on the electronic canvas; and
when the rotation angle is greater than the second predefined angular rotation value, rotating the displayed object in predefined rotational increments in accordance with the first gesture.

11. The multifunction device of claim 10, wherein once the calculated rotation angle has exceeded the second predefined angular rotation value, the displayed object is rotated in predefined rotational increments in accordance with the first gesture even if the calculated rotation angle falls below the second predefined angular rotation value.

12. The multifunction device of claim 10, including instructions for: when the current angle exceeds the first predefined angular rotation value, returning the electronic canvas to the first magnification level.

13. The multifunction device of claim 10, further comprising instructions for:
when the electronic canvas has been scaled in accordance with the first gesture to exceed a threshold scaling amount, maintaining the displayed object at an orientation corresponding to the initial angle independent of the calculated rotation angle.

14. The multifunction device of claim 9, wherein the electronic canvas displays objects configured to be manipulated in a drawing program.

15. The multifunction device of claim 9, further comprising instructions for:
detecting liftoff of the second contact from the touch-sensitive surface, and detecting that the first contact touches a location on the touch-sensitive surface corresponding to the at least one displayed object on the electronic canvas;
selecting the at least one displayed object when the first contact continues to touch the at least one displayed object for at least a first predefined time interval; and
displaying a context menu on the electronic canvas in response to detecting that the first contact touches a location on the touch-sensitive surface corresponding to the at least one displayed object for at least a second predefined time interval, wherein the second predefined time interval is greater than the first predefined time interval.

16. The multifunction device of claim 9, wherein the electronic canvas displays a map and the second magnification level is a hierarchical map zoom level selected from a group consisting of block, street, neighborhood, city, county, state, country, and continent.

17. A non-transitory computer readable storage medium storing one or more programs, the one or more programs comprising instructions, which when executed by a multifunction device with a display and a touch-sensitive surface, cause the device to:
  display an electronic canvas on the display at a first magnification level, wherein the displayed electronic canvas includes at least one displayed object;
  simultaneously detect a first contact at a first location and a second contact at a second location on the touch-sensitive surface, wherein at least one of the first contact location and the second contact location on the touch-sensitive surface is at a location that corresponds to a location on the display that is away from the at least one displayed object;
  detect a first gesture made with the first and second contacts on the touch-sensitive surface;
  in accordance with a determination that a velocity of the first gesture is less than a predefined gesture velocity threshold, scale the displayed electronic canvas in accordance with the first gesture; and
  in accordance with a determination that the velocity of the first gesture is greater than the predefined gesture velocity threshold, transition the displayed electronic canvas from the first magnification level to a second, predefined magnification level in response to the first gesture.

18. The computer readable storage medium of claim 17, wherein at least one of the first contact location and the second contact location on the touch-sensitive surface is at a location that corresponds to a location on the display that is on the at least one displayed object, the one or more programs comprising instructions, which when executed by the multifunction device with the display and the touch-sensitive surface, cause the device to:
  in response to detecting the first contact and the second contact by the user on the touch-sensitive surface, calculate an initial angle between an axis between the first contact and the second contact and an axis corresponding to the touch-sensitive surface;
  while detecting the first gesture, calculate a rotation angle between the initial angle and a current angle formed between the axis between the first contact and the second contact and the axis corresponding to the touch-sensitive surface;
  when the rotation angle is less than a first predefined angular rotation value, maintain the displayed object at an orientation corresponding to the initial angle;
  when the rotation angle is between the first predefined angular rotation value and a second predefined angular rotation value, rotate the displayed object by the calculated rotation angle on the electronic canvas; and
  when the rotation angle is greater than the second predefined angular rotation value, rotate the displayed object in predefined rotational increments in accordance with the first gesture.

19. The computer readable storage medium of claim 18, wherein once the calculated rotation angle has exceeded the second predefined angular rotation value, the displayed object is rotated in predefined rotational increments in accordance with the first gesture even if the calculated rotation angle falls below the second predefined angular rotation value.

20. The computer readable storage medium of claim 18, the one or more programs comprising instructions, which when executed by the multifunction device with the display and the touch-sensitive surface, cause the device to: when the current angle exceeds the first predefined angular rotation value, return the electronic canvas to the first magnification level.

21. The computer readable storage medium of claim 18, the one or more programs comprising instructions, which when executed by the multifunction device with the display and the touch-sensitive surface, cause the device to:
  when the electronic canvas has been scaled in accordance with the first gesture to exceed a threshold scaling amount, maintain the displayed object at an orientation corresponding to the initial angle independent of the calculated rotation angle.

22. The computer readable storage medium of claim 17, the one or more programs comprising instructions, which when executed by the multifunction device with the display and the touch-sensitive surface, cause the device to:
  detecting liftoff of the second contact from the touch-sensitive surface, and detecting that the first contact touches a location on the touch-sensitive surface corresponding to the at least one displayed object on the electronic canvas;
  selecting the at least one displayed object when the first contact continues to touch the at least one displayed object for at least a first predefined time interval; and
  displaying a context menu on the electronic canvas in response to detecting that the first contact touches a location on the touch-sensitive surface corresponding to the at least one displayed object for at least a second predefined time interval, wherein the second predefined time interval is greater than the first predefined time interval.

23. The computer readable storage medium of claim 17, wherein the electronic canvas displays a map and the second magnification level is a hierarchical map zoom level selected from a group consisting of block, street, neighborhood, city, county, state, country, and continent.

24. The computer readable storage medium of claim 17, wherein the electronic canvas displays objects configured to be manipulated in a drawing program.

25. A graphical user interface on a multifunction device with a display, a touch-sensitive surface, a memory, and one or more processors to execute one or more programs stored in the memory, the graphical user interface comprising:
  an electronic canvas on the display at a first magnification level, wherein the displayed electronic canvas includes at least one displayed object;
  wherein:
  a first contact at a first location and a second contact at a second location is simultaneously detected on the touch-sensitive surface, wherein at least one of the first contact location and the second contact location on the touch-sensitive surface is at a location that corresponds to a location on the display that is away from the at least one displayed object;
  a first gesture made with the first and second contacts is detected on the touch-sensitive surface;
  in accordance with a determination that a velocity of the first gesture is less than a predefined gesture velocity threshold, the displayed electronic canvas is scaled in accordance with the first gesture; and
  in accordance with a determination that the velocity of the first gesture is greater than the predefined gesture velocity threshold, the displayed electronic canvas is transitioned from the first magnification level to a second, predefined magnification level in response to the first gesture.

* * * * *

UNITED STATES PATENT AND TRADEMARK OFFICE
CERTIFICATE OF CORRECTION

| | | |
|---|---|---|
| PATENT NO. | : 8,619,100 B2 | Page 1 of 1 |
| APPLICATION NO. | : 12/567703 | |
| DATED | : December 31, 2013 | |
| INVENTOR(S) | : Jay Christopher Capela et al. | |

It is certified that error appears in the above-identified patent and that said Letters Patent is hereby corrected as shown below:

On the Title Page, item (75), please delete "Pittsburgh, OK" and add -- Pittsburgh, PA --.

Signed and Sealed this
Eleventh Day of March, 2014

Michelle K. Lee
*Deputy Director of the United States Patent and Trademark Office*